(12) United States Patent
Yang et al.

(10) Patent No.: US 10,536,973 B2
(45) Date of Patent: Jan. 14, 2020

(54) PREAMBLE TRANSMISSION METHOD AND APPARATUS

(71) Applicant: ZTE CORPORATION, Shenzhen (CN)

(72) Inventors: Ling Yang, Shenzhen (CN); Wei Gou, Shenzhen (CN); Yajun Zhao, Shenzhen (CN); Focai Peng, Shenzhen (CN); Feng Bi, Shenzhen (CN); Xincai Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/750,993

(22) PCT Filed: Aug. 5, 2016

(86) PCT No.: PCT/CN2016/093642
§ 371 (c)(1),
(2) Date: Feb. 7, 2018

(87) PCT Pub. No.: WO2017/025000
PCT Pub. Date: Feb. 16, 2017

(65) Prior Publication Data
US 2019/0124687 A1    Apr. 25, 2019

(30) Foreign Application Priority Data
Aug. 7, 2015 (CN) .............................. 201510484487

(51) Int. Cl.
*H04W 16/14* (2009.01)
*H04L 25/02* (2006.01)
(Continued)

(52) U.S. Cl.
CPC ....... *H04W 74/0808* (2013.01); *H04L 5/0007* (2013.01); *H04L 5/0048* (2013.01);
(Continued)

(58) Field of Classification Search
CPC .......................... H04W 74/0833; H04W 16/14
(Continued)

(56) References Cited

U.S. PATENT DOCUMENTS

2013/0315152 A1* 11/2013 Ratasuk ............... H04W 76/14
370/329
2014/0376483 A1* 12/2014 Hong .................. H04W 72/048
370/329
2015/0057011 A1*  2/2015 Di Girolamo .... H04W 74/0808
455/454

FOREIGN PATENT DOCUMENTS

CN      104247488 A    12/2014
CN      104301273 A     1/2015
(Continued)

OTHER PUBLICATIONS

3GPP TSG RAN WG1 Meeting #81 R1-153437 Fukuoka, Japan, May 25th-29th, 2015.
(Continued)

*Primary Examiner* — Angel T Brockman
(74) *Attorney, Agent, or Firm* — Cantor Colburn LLP

(57) ABSTRACT

Provided are a preamble transmission method and apparatus. The method comprises: a UE executing LBT on a first time frequency resource of an unlicensed carrier until a right to use the unlicensed carrier is acquired, wherein the LBT comprises LBT executed for transmitting a preamble; and after a right to use the access to the unlicensed carrier is acquired, the UE transmitting the preamble on a second time frequency resource located behind the first time frequency resource, wherein the second time frequency resource is a pre-configured PRACH time frequency resource at a fixed position, or a PRACH time frequency resource determined according to an LBT execution position. By means of the present disclosure, the problem in the relevant art of intra-cell interference caused by uplink data transmission over an (Continued)

unlicensed carrier is solved, and the uplink data transmission quality is improved.

18 Claims, 6 Drawing Sheets

(51) Int. Cl.
    *H04W 74/08*     (2009.01)
    *H04L 5/00*     (2006.01)
    *H04W 72/04*     (2009.01)

(52) U.S. Cl.
    CPC ......... *H04L 25/0226* (2013.01); *H04W 16/14* (2013.01); *H04W 72/0446* (2013.01); *H04W 74/0833* (2013.01); *H04W 72/0453* (2013.01)

(58) Field of Classification Search
    USPC ........................................................ 370/329
    See application file for complete search history.

(56) References Cited

FOREIGN PATENT DOCUMENTS

| | | |
|---|---|---|
| CN | 104735729 A | 6/2015 |
| WO | 2015021285 A2 | 2/2015 |
| WO | 2015023910 A2 | 2/2015 |
| WO | 2015054294 A2 | 4/2015 |

OTHER PUBLICATIONS

China Patent Office, First Office Action dated Oct. 28, 2019; Corresponding to Chinese Application No. 201510484487.

\* cited by examiner

PREAMBLE TRANSMISSION METHOD AND APPARATUS

CROSS-REFERENCE TO RELATED APPLICATION

This application is based upon and claims priority to PCT Application No. PCT/CN2016/093642, filed Aug. 5, 2016, which is based upon and claims priority to Chinese Patent Application No. 201510484487.X, filed Aug. 7, 2015, the entire contents of which are incorporated herein by reference.

TECHNICAL FIELD

The present disclosure relates to the field of communication, and in particular, to a preamble transmission method and a preamble transmission apparatus.

BACKGROUND

With the rapid growth of data services, there is increasing pressure on data transmission on licensed carriers. Therefore, sharing data traffic of licensed carriers on unlicensed carriers becomes an important development trend of subsequent LTE. An unlicensed carrier has the following features.

1. An unlicensed spectrum does not need to be paid, and the spectrum resource is at zero cost, therefore, it has a free/low-cost feature.

2. Individuals, businesses can participate in the deployment, and equipment vendors can deploy any equipment, therefore, it has low access requirements and low cost features.

3. An unlicensed frequency band covers available 5 GHz, 2.4 GHz and other bands, therefore, it has a large available bandwidth feature.

4. An unlicensed carrier has a resource sharing feature. That is, when multiple different systems are operating or different operators in the same system are operating on the unlicensed carrier, some ways of sharing resources may be considered to improve the spectral efficiency.

5. An unlicensed carrier has a feature of accommodating various wireless access technologies, that is, accommodating different communication standards with complex collaboration and diverse network topologies.

6. An unlicensed carrier has a feature of covering a huge number of wireless access sites, that is, has a large number of users with complex collaboration and high overhead for centralized management.

7. An unlicensed carrier has a feature of applying to many applications, that is, many services are mentioned to be operable on the unlicensed carrier, such as machine to machine (referred to as M2M) and vehicle to vehicle (referred to as V2V).

Based on the above requirements, the version LTE Rel-13 finally started its project research in September 2014. One of the important topics is that LTE systems work on unlicensed carriers. This technology will enable the LTE system to use the existing unlicensed carriers and greatly enhance the potential spectrum resources of the LTE system such that the LTE system can achieve lower spectrum cost.

Currently, the method for accessing on an unlicensed carrier is called Licensed-Assisted Access (LAA for short). For the LAA uplink, the uplink function should at least ensure that the uplink can operate normally. The basic functions of uplink include: uplink LBT process before data transmission, SRS process used for measuring uplink channel, PRACH process and the like. The PRACH process is used to acquire a Timing Advance (TA) value, request an uplink resource and acquire a transmission power. During the PRACH process, the Preamble code is sent to inform a base station that there is a random access request and enable the base station to estimate the transmission delay between the base station and the UE, such that the base station calibrates the uplink timing and sends the calibration information to the UE through timing advance signaling. For uplink data transmission on an unlicensed carrier, as the Preamble is not transmitted on the UE side, the uplink signals of different UEs in the same cell may not reach the base station at the same time, which may cause serious intra-cell interference problem.

With respect to the problem that the uplink data transmission on the unlicensed carrier may cause intra-cell interference in the related art, no effective solution has been proposed yet.

This section provides background information related to the present invention which is not necessarily prior art.

SUMMARY

Embodiments of the present disclosure provide a preamble transmission method and apparatus, to at least solve the problem that the uplink data transmission on the unlicensed carrier may cause intra-cell interference in the related art.

According to an embodiment of the present disclosure, there is provided a preamble transmission method including: performing, by a user equipment (UE for short), a Listen Before Talk (LBT for short) on a first time-frequency resource of an unlicensed carrier until obtaining a right to use the unlicensed carrier, the LBT including a LBT performed for transmitting a preamble; and after obtaining the right to use the unlicensed carrier, transmitting, by the UE, the preamble on a second time-frequency resource located after the first time-frequency resource; wherein the second time-frequency resource is a time-frequency resource of a Physical Random Access Channel (PRACH for short) at a preconfigured fixed position, or a PRACH time-frequency resource determined according to the position for performing the LBT.

Optionally, the first time-frequency resource includes one of: one orthogonal frequency division multiplexing (OFDM for short) symbol or multiple OFDM symbols before the second time-frequency resource; and one sub-frame or multiple sub-frames before the second time-frequency resource; wherein the second time-frequency resource includes one sub-frame or multiple sub-frames or one OFDM symbol or multiple OFDM symbols.

Optionally, in the case that the first time-frequency resource is one sub-frame or multiple sub-frames before the second time-frequency resource, the first time-frequency resource includes one of: the last OFDM symbol or the last multiple OFDM symbols of one sub-frame before the second time-frequency resource; and all or a part of OFDM symbols of multiple sub-frames before the second time-frequency resource.

Optionally, the performing, by the UE, the LBT on the first time-frequency resource of the unlicensed carrier includes one of: in the case that the first time-frequency resource is one OFDM symbol, performing, by the UE, a first LBT over a first time period within said one OFDM symbol; in the case that the first time-frequency resource is multiple OFDM symbols, performing, by the UE, the first LBT over a first time period within the first OFDM symbol of the multiple OFDM symbols or within the multiple OFDM symbols; in the case that the first time-frequency resource is one sub-frame, performing, by the UE, the first LBT over a first time period within the first OFDM symbol of said one sub-frame or within said one sub-frame; and in the case that the first time-frequency resource is multiple sub-frames, performing, by the UE, the first LBT over a first time period within the first OFDM symbol of the multiple sub-frames or within the first sub-frame of the multiple sub-frames or within the multiple sub-frames.

Optionally, the performing, by the UE, the LBT on the first time-frequency resource of the unlicensed carrier further includes at least one of: in the case that the first time-frequency resource is one OFDM symbol, performing, by the UE, a second LBT over a second time period within said one OFDM symbol; in the case that the first time-frequency resource is one OFDM symbol, performing, by the UE, a third LBT over a third time period within said one OFDM symbol; in the case that the first time-frequency resource is multiple OFDM symbols, performing, by the UE, the second LBT over a second time period within the second OFDM symbol of the multiple OFDM symbols or within the multiple OFDM symbols; in the case that the first time-frequency resource is multiple OFDM symbols, performing, by the UE, the third LBT over a third time period within the third OFDM symbol of the multiple OFDM symbols or within the multiple OFDM symbols; in the case that the first time-frequency resource is one sub-frame, performing, by the UE, the second LBT over a second time period within the second OFDM symbol of said one sub-frame or within said one sub-frame; in the case that the first time-frequency resource is one sub-frame, performing, by the UE, the third LBT over a third time period within the third OFDM symbol of said one sub-frame or within said one sub-frame; in the case that the first time-frequency resource is multiple sub-frames, performing, by the UE, the second LBT over a second time period within the second OFDM symbol of the multiple sub-frames or within the second sub-frame of the multiple sub-frames or within the multiple sub-frames; and in the case that the first time-frequency resource is multiple sub-frames, performing, by the UE, the third LBT over a third time period within the third OFDM symbol of the multiple sub-frames or within the third sub-frame of the multiple sub-frames or within the multiple sub-frames.

Optionally, LBTs performed on different time periods include at least one of: a LBT performed for transmitting a preamble, a LBT performed for transmitting a sounding reference signal (SRS for short), and a LBT performed for transmitting Physical Uplink Shared Channel (PUSCH for short), wherein the different time periods include: a first time period, a second time period, and a third time period.

Optionally, the first OFDM symbol is an OFDM symbol before the second OFDM symbol, and the second OFDM symbol is an OFDM symbol before the third OFDM symbol; or, the first time period is a time period before the second time period, and the second time period is a time period before the third time period; or, the first sub-frame is a sub-frame before the second sub-frame, and the second sub-frame is a sub-frame before the third sub-frame.

Optionally, the performing, by the UE, the LBT on the first time-frequency resource of the unlicensed carrier includes one of: performing, by the UE, one Clear Channel Assessment (CCA for short) detection on the first time-frequency resource; performing, by the UE, multiple CCA detections on the first time-frequency resource; directly performing, by the UE, Evolution Clear Channel Assessment (eCCA for short) detection on the first time-frequency resource; and after performing one CCA detection on the first time-frequency resource, performing, by the UE, eCCA detection.

Optionally, a detection duration of the CCA detection is determined according to one of: predefinition; DCI information of a base station; and a parameter in the process of performing the LBT determined based on a frame structure or the UE scheduled condition or a time domain resource duration in the first time-frequency resource, and a duration corresponding to the parameter.

Optionally, the detection duration of the CCA detection includes one of: 34 us, 25 us, 20 us, 18 us, 16 us, 10 us and 9 us.

Optionally, in the case that the UE performs multiple CCA detections on the first time-frequency resource, the number of detections for performing the CCA detection is preconfigured, or configured by the base station, or determined according to the following conditions: a time domain resource duration in the first time-frequency resource, and a detection duration of the CCA detection.

Optionally, the performing, by the UE, eCCA detection on the first time-frequency resource includes: performing, by the UE, eCCA detection on the first time-frequency resource to detect whether the unlicensed carrier is idle, a random rollback value N for the eCCA detection being a value selected in a given contention window, which is as small as possible, and the eCCA detection process including one or more random rollback CCA detections, when detecting that the unlicensed carrier is idle, performing, by the UE, an operation of decreasing the value N; when detecting that the unlicensed carrier is busy, performing, by the UE, one of the following operations: the UE directly entering the next random rollback CCA detection; or the UE entering a defer period, and after detecting that the unlicensed carrier is idle in the defer period, performing the random rollback CCA detection; wherein when detecting that the unlicensed carrier is idle and the value N is decreased to a target value, it indicates that the right to use the unlicensed carrier is obtained.

Optionally, the UE entering a defer period and performing the random rollback CCA detection after detecting that the unlicensed carrier is idle in the defer period includes: entering, by the UE, the defer period and detecting whether the unlicensed carrier is idle during the defer period; when detecting that the unlicensed carrier is idle during the defer period, performing, by the UE, an operation of decreasing the value N; after performing the operation of decreasing the value N, determining, by the UE, whether the current value N is a target value; wherein when the determining result is that the current value N is the target value, it indicates that the right to use the unlicensed carrier is obtained; and when the determining result is that the current value N is not the target value, the UE performs the random rollback CCA detection; and when detecting that the unlicensed carrier is idle in the random rollback CCA, performing, by the UE, an operation of decreasing the value N and determining whether the current value N is a target value; wherein when the determining result is that the current value N is the target value, it indicates that the right to use the unlicensed carrier is obtained; and when the determining result is that the current value N is not the target value, the UE performs the next random rollback CCA detection.

Optionally, the UE entering a defer period and performing the random rollback CCA detection after detecting that the unlicensed carrier is idle in the defer period includes: entering, by the UE, the defer period and detecting whether the unlicensed carrier is idle during the defer period; when detecting that the unlicensed carrier is idle in the defer period, freezing, by the UE, the value N in the defer period and performing the random rollback CCA detection; and when detecting that the unlicensed carrier is idle in the random rollback CCA detection, performing, by the UE, an operation of decreasing the value N and determining whether the current value N is a target value; wherein when the determining result is that the current value N is the target value, it indicates that the right to use the unlicensed carrier is obtained; and when the determining result is that the current value N is not the target value, the UE performs the next random rollback CCA detection.

Optionally, a duration of the defer period includes one of: 34 us, 25 us, 20 us, 18 us, 16 us, 10 us, 9 us and 0 us.

Optionally, a detection duration of the random rollback CCA detection includes one of: 10 us and 9 us.

Optionally, the value N is determined by one of: preconfigured, configured by the base station and randomly generated.

Optionally, a physical resource block PRB occupied by the second time-frequency resource in the frequency domain is transmitted on a preset frequency domain resource, wherein the preset frequency domain resource occupies no less than a predetermined ratio of frequency domain resources of the total bandwidth of the unlicensed carrier.

Optionally, the PRB occupied by the second time-frequency resource in the frequency domain and the PRBs occupied by time-frequency resources for transmitting preambles of other UEs than the UE in the frequency domain occupy the entire preset frequency domain resource at a first predetermined frequency domain interval; or the PRB occupied by the second time-frequency resource in the frequency domain is duplicated into multiple copies, and the multiple copies of the PRB occupy the entire preset frequency domain resource at a second frequency domain interval; or the PRB occupied by the second time-frequency resource in the frequency domain is duplicated into multiple copies, and the multiple copies of the PRB occupy the entire preset frequency domain resource continuously; or an interval of sub carriers of the PRB is modified to cause the PRB occupied by the second time-frequency resource in the frequency domain to occupy the entire preset frequency domain resource; or the preamble is encoded according to a specific encoding rule to cause the PRB occupied by the second time-frequency resource for transmitting the preamble in the frequency domain to occupy the entire preset frequency domain resource.

Optionally, the first time-frequency resource or the second time-frequency resource is determined by at least one of: high-layer RRC signaling, physical layer DCI signaling, a predefined manner, previously determined by the base station and the UE; and the LBT completed time.

Optionally, the total occupied bandwidth of the second time-frequency resource occupied for transmitting the preamble which satisfies the regulatory requirement of the unlicensed carrier being no less than a predetermined ratio includes at least one of: frequency domain resources occupied by each user equipment being the same, and a specified frequency domain interval being reserved between every two second time-frequency resources; the second frequency domain resource being repeatedly transmitted N times in the frequency domain; the second frequency domain resource being repeatedly transmitted N times in the frequency domain and a specified frequency domain interval being provided between every two times of transmission; the user equipment transmitting the preamble code according to a specified frequency domain pattern; and a method for modifying a subcarrier interval being employed.

Optionally, the subcarrier interval includes one of: 1.25 kHz, 2.5 kHz, 3.75 kHz, 5 kHz, 7.5 kHz, 10 kHz, 15 kHz, 20 kHz, 30 kHz, 60 kHz and 120 kHz.

According to another embodiment of the present disclosure, there is also provided a preamble transmission apparatus, applied in a UE, including: a performing module configured to perform a LBT on a first time-frequency resource of an unlicensed carrier until a right to use the unlicensed carrier is obtained, the LBT including a LBT performed for transmitting a preamble; and a transmitting module configured, after the right to use the unlicensed carrier is obtained, for the UE to transmit the preamble on a second time-frequency resource located after the first time-frequency resource; wherein the second time-frequency resource is a time-frequency resource of a PRACH at a preconfigured fixed position, or a PRACH time-frequency resource determined according to the position for performing the LBT.

Optionally, the first time-frequency resource includes one of: one orthogonal frequency division multiplexing OFDM symbol or multiple OFDM symbols before the second time-frequency resource; and one sub-frame or multiple sub-frames before the second time-frequency resource; wherein the second time-frequency resource includes one sub-frame or multiple sub-frames or one OFDM symbol or multiple OFDM symbols.

Optionally, in the case that the first time-frequency resource is one sub-frame or multiple sub-frames before the second time-frequency resource, the first time-frequency resource includes one of: the last OFDM symbol or the last multiple OFDM symbols of one sub-frame before the second time-frequency resource; and all or a part of OFDM symbols of multiple sub-frames before the second time-frequency resource.

Optionally, the performing module includes a first performing unit configured to perform one of: in the case that the first time-frequency resource is one OFDM symbol, performing, for the UE, a first LBT over a first time period within said one OFDM symbol, the first LBT being a LBT performed for transmitting the preamble; in the case that the first time-frequency resource is multiple OFDM symbols, performing, for the UE, the first LBT over a first time period within the first OFDM symbol of the multiple OFDM symbols or within the multiple OFDM symbols; in the case that the first time-frequency resource is one sub-frame, performing, for the UE, the first LBT over a first time period within the first OFDM symbol of said one sub-frame or within said one sub-frame; and in the case that the first time-frequency resource is multiple sub-frames, performing, for the UE, the first LBT over a first time period within the first OFDM symbol of the multiple sub-frames or within the first sub-frame of the multiple sub-frames or within the multiple sub-frames.

Optionally, the performing module further includes: a second performing unit configured to perform one of: in the case that the first time-frequency resource is one OFDM symbol, performing, for the UE, a second LBT over a second time period within said one OFDM symbol, the second LBT being a LBT performed for transmitting a sounding reference signal SRS; in the case that the first time-frequency resource is multiple OFDM symbols, performing, for the UE, the second LBT over a second time period within the second OFDM symbol of the multiple OFDM symbols or within the multiple OFDM symbols; in the case that the first time-frequency resource is one sub-frame, performing, for the UE, the second LBT over a second time period within the second OFDM symbol of said one sub-frame or within said one sub-frame; and in the case that the first time-frequency resource is multiple sub-frames, performing, for the UE, the second LBT over a second time period within the second OFDM symbol of the multiple sub-frames or within the second sub-frame of the multiple sub-frames or within the multiple sub-frames; and/or, a third performing unit configured to perform one of: in the case that the first time-frequency resource is one OFDM symbol, performing, for the UE, a third LBT over a third time period within said one OFDM symbol, the third LBT being a LBT performed for transmitting a physical uplink shared channel PUSCH; in the case that the first time-frequency resource is multiple OFDM symbols, performing, for the UE, the third LBT over a third time period within the third OFDM symbol of the multiple OFDM symbols or within the multiple OFDM symbols; in the case that the first time-frequency resource is one sub-frame, performing, for the UE, the third LBT over a third time period within the third OFDM symbol of said one sub-frame or within said one sub-frame; and in the case that the first time-frequency resource is multiple sub-frames, performing, for the UE, the third LBT over a third time period within the third OFDM symbol of the multiple sub-frames or within the third sub-frame of the multiple sub-frames or within the multiple sub-frames.

Optionally, the first OFDM symbol is an OFDM symbol before the second OFDM symbol, and the second OFDM symbol is an OFDM symbol before the third OFDM symbol; or, the first time period is a time period before the second time period, and the second time period is a time period before the third time period; or, the first sub-frame is a sub-frame before the second sub-frame, and the second sub-frame is a sub-frame before the third sub-frame.

Optionally, the performing module includes: a first detection unit and/or a second detection unit, the first detection unit is configured to perform one or multiple Clear Channel Assessment CCA detections on the first time-frequency resource; and the second detection unit is configured to perform one or multiple Evolution Clear Channel Assessment eCCA detections on the first time-frequency resource.

Optionally, a detection duration of the CCA detection is determined according to one of: predefinition; Downlink Control Information (DCI) information of a base station; and a parameter in the process of performing the LBT determined based on a frame structure or the UE scheduled condition or a time domain resource duration in the first time-frequency resource, and a duration corresponding to the parameter.

Optionally, the detection duration of the CCA detection includes one of: 34 us, 25 us, 20 us, 18 us, 16 us, 10 us and 9 us.

Optionally, in the case that the first detection unit performs multiple CCA detections on the first time-frequency resource, the number of detections for the first detection unit performing the CCA detection is preconfigured, or configured by the base station, or determined according to the following conditions: a time domain resource duration in the first time-frequency resource, and a detection duration of the CCA detection.

Optionally, the second detection unit includes: a first detection subunit configured to perform eCCA detection on the first time-frequency resource to detect whether the unlicensed carrier is idle, a random rollback value N for the eCCA detection being a value selected in a given contention window, which is as small as possible, and the eCCA detection process including one or more random rollback CCA detections, a first decrementing subunit configured to, when it is detected that the unlicensed carrier is idle, perform an operation of decreasing the value N; a first processing subunit configured to, when it is detected that the unlicensed carrier is busy, directly enter the next random rollback CCA detection; or a second processing subunit configured to, when it is detected that the unlicensed carrier is busy, enter a defer period, and after it is detected that the unlicensed carrier is idle in the defer period, perform the random rollback CCA detection; wherein when it is detected that the unlicensed carrier is idle and the value N is decreased to a target value, it indicates that the right to use the unlicensed carrier is obtained.

Optionally, the second processing subunit includes: a first detection grandchild unit configured to enter the defer period and detect whether the unlicensed carrier is idle during the defer period; a first performing grandchild unit configured to, when it is detected that the unlicensed carrier is idle during the defer period, perform an operation of decreasing the value N; a second detection grandchild unit configured to, after the operation of decreasing the value N is performed, determine whether the current value N is a target value; when the determining result is that the current value N is the target value, it indicating that the right to use the unlicensed carrier is obtained; and when the determining result is that the current value N is not the target value, perform the random rollback CCA detection; and a second performing grandchild unit configured to, when it is detected that the unlicensed carrier is idle in the random rollback CCA, perform an operation of decreasing the value N and determine whether the current value N is a target value; when the determining result is that the current value N is the target value, it indicating that the right to use the unlicensed carrier is obtained; and when the determining result is that the current value N is not the target value, perform the next random rollback CCA detection.

Optionally, the second processing subunit includes: a third detection grandchild unit configured to enter the defer period and detect whether the unlicensed carrier is idle during the defer period; a fourth detection grandchild unit configured to, when it is detected that the unlicensed carrier is idle in the defer period, freeze the value N in the defer period and perform the random rollback CCA detection; and a third performing grandchild unit configured to, when it is detected that the unlicensed carrier is idle in the random rollback CCA detection, perform an operation of decreasing the value N and determine whether the current value N is a target value; when the determining result is that the current value N is the target value, it indicating that the right to use the unlicensed carrier is obtained; and when the determining result is that the current value N is not the target value, perform the next random rollback CCA detection.

Optionally, a duration of the defer period includes one of: 34 us, 25 us, 20 us, 18 us, 16 us, 10 us, 9 us and 0 us.

Optionally, a detection duration of the random rollback CCA detection includes one of: 10 us and 9 us.

Optionally, the value N is determined by one of: preconfigured, configured by the base station and randomly generated.

Optionally, a physical resource block PRB occupied by the second time-frequency resource in the frequency domain is transmitted on a preset frequency domain resource, wherein the preset frequency domain resource occupies no less than a predetermined ratio of frequency domain resources of the total bandwidth of the unlicensed carrier.

Optionally, the PRB occupied by the second time-frequency resource in the frequency domain and the PRBs occupied by time-frequency resources for transmitting preambles of other UEs than the UE in the frequency domain occupy the entire preset frequency domain resource at a first predetermined frequency domain interval; or the PRB occupied by the second time-frequency resource in the frequency domain is duplicated into multiple copies, and the multiple copies of the PRB occupy the entire preset frequency domain resource at a second frequency domain interval; or the PRB occupied by the second time-frequency resource in the frequency domain is duplicated into multiple copies, and the multiple copies of the PRB occupy the entire preset frequency domain resource continuously; or an interval of sub carriers of the PRB is modified to cause the PRB occupied by the second time-frequency resource in the frequency domain to occupy the entire preset frequency domain resource; or the preamble is encoded according to a specific encoding rule to cause the PRB occupied by the second time-frequency resource for transmitting the preamble in the frequency domain to occupy the entire preset frequency domain resource.

In an embodiment of the present disclosure, a computer storage medium is also provided, where the computer storage medium may store an execution instruction for implementing the preamble transmission method in the foregoing embodiment.

Through the embodiments of the present disclosure, the UE performs the LBT on the first time-frequency resource of the unlicensed carrier until the right to use the unlicensed carrier is obtained, the LBT including a LBT performed for transmitting a preamble. After the right to use the unlicensed carrier is obtained, the UE transmits a preamble on a second time-frequency resource after the first time-frequency resource; the second time-frequency resource is a time-frequency resource of PRACH at a preconfigured fixed position, or a PRACH time-frequency resource determined according to the position for performing the LBT. It can solve the problem that the uplink data transmission on the unlicensed carrier may cause intra-cell interference in the related art and can improve the quality of the uplink data transmission.

This section provides a summary of various implementations or examples of the technology described in the present invention, and is not a comprehensive disclosure of the full scope or all features of the disclosed technology.

BRIEF DESCRIPTION OF THE DRAWINGS

The drawings described herein are used to provide a further understanding of the present disclosure and constitute a part of the present application. The schematic embodiments and the descriptions of the present disclosure are used to explain the present disclosure, and do not constitute improper limitations to the present disclosure. In the drawings.

DETAILED DESCRIPTION

Hereinafter, the present disclosure will be described in detail with reference to the accompanying drawings and embodiments. It should be noted that, in the case of no conflict, the embodiments in the present application and the features in the embodiments may be combined with each other.

It should be noted that the terms "first", "second" and the like in the description and claims of the present disclosure as well as the above drawings are used to distinguish similar objects, and are not necessarily used to describe a specific sequence or an order.

Figure 1:
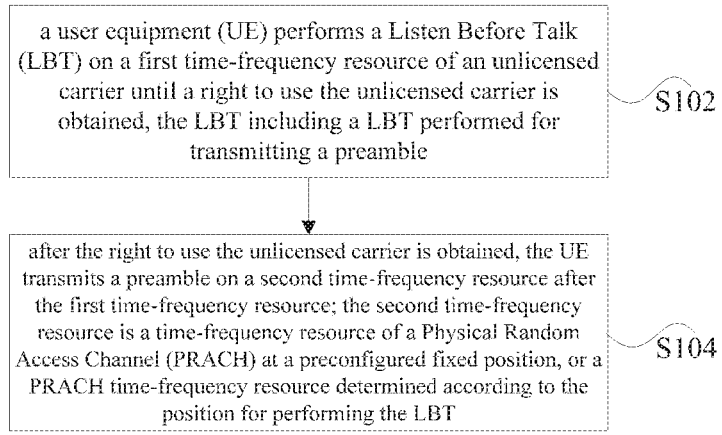
FIG. 1 is a flowchart of a preamble transmission method according to an embodiment of the present disclosure.

In the embodiment, a preamble transmission method is provided. FIG. 1 is a flowchart of a preamble transmission method according to an embodiment of the present disclosure. As shown in FIG. 1, the method includes the following steps.

In Step S102, a user equipment (UE) performs a LBT on a first time-frequency resource of an unlicensed carrier until a right to use the unlicensed carrier is obtained, the LBT including a LBT performed for transmitting a preamble.

In Step S104, after the right to use the unlicensed carrier is obtained, the UE transmits a preamble on a second time-frequency resource after the first time-frequency resource; the second time-frequency resource is a time-frequency resource of a Physical Random Access Channel (PRACH) at a preconfigured fixed position, or a PRACH time-frequency resource determined according to the position for performing the LBT.

Through the above steps, after performing the LBT on the first time-frequency resource and obtaining by contention the right to use the unlicensed carrier, a preamble is transmitted on the second time-frequency resource of the unlicensed carrier obtained by the contention. In this way, the base station can acquire the TA of the UE, so as to avoid intra-cell interference problem caused by the fact that the uplink signals transmitted by multiple UEs in the same cell may not reach the base station at the same time, improving the quality of uplink data transmission. Moreover, carrying out the LBT mechanism before transmitting the preamble also satisfies regulatory requirements on the unlicensed carrier.

The above method can be applied in a LTE system. However, it is also conceivable that the method can be applied in a GSM system or in a subsequent evolution of the LTE system. No matter what communication system is adopted, when an unlicensed carrier is used, the above preamble transmission method can be applied to achieve access without conflict.

The above-mentioned UE includes a mobile station or other portable or non-portable device that can access a wireless communication system by using a carrier over a wireless communication network, such as a tablet computer with wireless fidelity (WiFi) access function, or a Personal Computer (PC) with built-in/external Subscriber Identity Module (SIM).

Alternatively, the first time-frequency resource includes one of: one orthogonal frequency division multiplexing OFDM symbol or multiple OFDM symbols before the second time-frequency resource; and one sub-frame or multiple sub-frames before the second time-frequency resource. The second time-frequency resource includes one sub-frame or multiple sub-frames or one OFDM symbol or multiple OFDM symbols.

Alternatively, in the case that the first time-frequency resource is one sub-frame or multiple sub-frames before the second time-frequency resource, the first time-frequency resource includes one of: the last OFDM symbol or the last multiple OFDM symbols of one sub-frame before the second time-frequency resource; and all or a part of OFDM symbols of multiple sub-frames before the second time-frequency resource. In addition, although the first time-frequency resource is preferably located on the last OFDM symbol or the last multiple OFDM symbols of one or more sub-frames, the first time-frequency resource may also be located on other OFDM or other multiple continuous OFDM symbols than the last OFDM of the one or more sub-frames.

Alternatively, depending on the different first time-frequency resources, the Step S102 includes the following processes.

In the case that the first time-frequency resource is one OFDM symbol, the UE performs a first LBT over a first time period within said one OFDM symbol, and the first LBT is a LBT performed for transmitting the preamble.

Alternatively, in the case that the first time-frequency resource is multiple OFDM symbols, the UE performs the first LBT over a first time period within the first OFDM symbol of the multiple OFDM symbols or within the multiple OFDM symbols.

Alternatively, in the case that the first time-frequency resource is one sub-frame, the UE performs the first LBT over a first time period within the first OFDM symbol of said one sub-frame or within said one sub-frame.

Alternatively, in the case that the first time-frequency resource is multiple sub-frames, the UE performs the first LBT over a first time period within the first OFDM symbol of the multiple sub-frames or within the first sub-frame of the multiple sub-frames or within the multiple sub-frames.

Alternatively, the UE performs a LBT on a first time-frequency resource of an unlicensed carrier also includes at least one of the following.

In the case that the first time-frequency resource is one OFDM symbol, the UE performs a second LBT over a second time period within said one OFDM symbol, and the second LBT is a LBT performed for transmitting a sounding reference signal SRS.

In the case that the first time-frequency resource is one OFDM symbol, the UE performs a third LBT over a third time period within said one OFDM symbol, and the third LBT is a LBT performed for transmitting a physical uplink shared channel PUSCH.

In the case that the first time-frequency resource is multiple OFDM symbols, the UE performs the second LBT over a second time period within the second OFDM symbol of the multiple OFDM symbols or within the multiple OFDM symbols.

In the case that the first time-frequency resource is multiple OFDM symbols, the UE performs the third LBT over a third time period within the third OFDM symbol of the multiple OFDM symbols or within the multiple OFDM symbols.

In the case that the first time-frequency resource is one sub-frame, the UE performs the second LBT over a second time period within the second OFDM symbol of said one sub-frame or within said one sub-frame.

In the case that the first time-frequency resource is one sub-frame, the UE performs the third LBT over a third time period within the third OFDM symbol of said one sub-frame or within said one sub-frame.

In the case that the first time-frequency resource is multiple sub-frames, the UE performs the second LBT over a second time period within the second OFDM symbol of the multiple sub-frames or within the second sub-frame of the multiple sub-frames or within the multiple sub-frames.

In the case that the first time-frequency resource is multiple sub-frames, the UE performs the third LBT over a third time period within the third OFDM symbol of the multiple sub-frames or within the third sub-frame of the multiple sub-frames or within the multiple sub-frames.

Moreover, the priorities for transmitting the preamble, the SRS, and the PUSCH may be determined according to the order in which the first LBT, the second LBT, and the third LBT are performed in the first time-frequency resource. For example, in the case that the first LBT is performed before the second LBT is performed, if the first LBT successfully obtains by contention the unlicensed carrier, the preamble is transmitted on the unlicensed carrier; otherwise, after the first LBT is performed (and fails in the contention for the unlicensed carrier), the second LBT is performed, to continue to contest for the unlicensed carrier. If the second LBT is performed to successfully obtain by contention the unlicensed carrier, the SRS is transmitted on the unlicensed carrier. The other priority levels contesting for the unlicensed carrier is similar to the above process, which will not be described herein.

It should be noted that, in addition to the LBT performed for transmitting the preamble, the above first LBT in the first time period also includes at least: a LBT performed for transmitting a sounding reference signal SRS, and a LBT performed for transmitting a physical uplink shared channel PUSCH. In addition to the LBT performed for transmitting the sounding reference signal SRS, the above second LBT in the second time period also includes at least: a LBT performed for transmitting a preamble, and a LBT performed for transmitting a physical uplink shared channel PUSCH. In addition to the LBT performed for transmitting the physical uplink shared channel PUSCH, the above third LBT in the third time period also includes at least: a LBT performed for transmitting a preamble, and a LBT performed for transmitting a sounding reference signal SRS.

Alternatively, as an example, the PRACH is transmitted in top priority (that is, the preamble is transmitted in top priority), the SRS is transmitted in second priority and the PUSCH is transmitted lastly. In this case, the first OFDM symbol is an OFDM symbol before the second OFDM symbol, and the second OFDM symbol is an OFDM symbol before the third OFDM symbol. Alternatively, the first time period is a time period before the second time period, and the second time period is a time period before the third time period. Alternatively, the first sub-frame is a sub-frame before the second sub-frame, and the second sub-frame is a sub-frame before the third sub-frame.

Alternatively, the LBT process includes one or more CCA processes. For example, in the Step S102, the LBT mechanism may be completed by one of the following ways: the UE performs one CCA detection on the first time-frequency resource; the UE performs multiple CCA detections on the first time-frequency resource; the UE performs no CCA detection on the first time-frequency resource, but directly performs eCCA detection; and the UE performs one CCA detection on the first time-frequency resource and then performs eCCA detection.

Alternatively, the detection duration for the CCA detection is determined according to one of the following: pre-definition; DCI information of the base station; a parameter in the process of performing the LBT determined based on the frame structure or the UE scheduled condition or the time domain resource duration in the first time-frequency resource, and the duration corresponding to the parameter.

Alternatively, the detection duration of the CCA detection includes one of the following: 34 us, 25 us, 20 us, 18 us, 16 us, 10 us and 9 us.

Alternatively, in the case that the UE performs multiple CCA detections on the first time-frequency resource, the number of times for performing the CCA detections may be preconfigured, or may be configured by the base station, or determined according to the following conditions: the time domain resource duration in the first time-frequency resource, and the detection duration for the CCA detection. The positions for the multiple CCA detections may be continuous, discontinuous and overlapping. Preferably, the UE may randomly select the positions for the multiple CCA detections.

Alternatively, the UE performing eCCA detection on the first time-frequency resource includes: the UE performing eCCA detection on the first time-frequency resource to detect whether the unlicensed carrier is idle. The random rollback value N for the eCCA detection is a value selected in a given contention window, which is as small as possible. The eCCA detection process includes one or more random rollback CCA detections. In the case that the unlicensed carrier is detected to be idle, the UE performs an operation of decreasing the value N. When detecting that the unlicensed carrier is busy, the UE performs one of the following operations: adopting a non-random rollback LBT mechanism or adopting a random rollback LBT mechanism. When it is detected that the unlicensed carrier is idle and the value N is decreased to the target value, it indicates that the right to use the unlicensed carrier is obtained.

Alternatively, in the embodiment, the random rollback LBT mechanism may be as follows: the UE enters a defer period, and detects whether the unlicensed carrier is idle during the defer period; and when it is detected that the unlicensed carrier is idle in the defer period, the UE performs the operation of decreasing the value N. After the UE performs the operation of decreasing the value N, the UE determines whether the current value N is the target value. If it is determined that the current value N is the target value, it indicates that the right to use the unlicensed carrier is obtained; and if it is determined that the current value N is not the target value, the UE performs the random rollback CCA detection. When it is detected in the random rollback CCA detection that the unlicensed carrier is idle, the UE performs the operation of decreasing the value N and determines whether the current value N is the target value. If it is determined that the current value N is the target value, it indicates that the right to use the unlicensed carrier is obtained; and if it is determined that the current value N is not the target value, the UE performs the next random rollback CCA detection.

Alternatively, in the embodiment, the random rollback LBT mechanism may further be: the UE enters a defer period, and detects whether the unlicensed carrier is idle during the defer period; and when it is detected that the unlicensed carrier is idle in the defer period, freezes the value N in the defer period and performs random rollback CCA detection. When it is detected that the unlicensed carrier is idle in the random rollback CCA detection, the UE performs the operation of decreasing the value N and determines whether the current value N is the target value. If it is determined that the current value N is the target value, it indicates that the right to use the unlicensed carrier is obtained; and if it is determined that the current value N is not the target value, the UE performs the next random rollback CCA detection.

Alternatively, the duration of the defer period includes one of the following: 34 us, 25 us, 20 us, 18 us, 16 us, 10 us, 9 us and 0 us.

Alternatively, the detection duration for the random rollback CCA includes one of the following: 10 us and 9 us.

Alternatively, the value N is determined according to one of the following ways: preconfigured on the UE, configured by the base station and randomly generated.

Alternatively, the PRB occupied by the second time-frequency resource in the frequency domain is transmitted on a preset frequency domain resource. The preset frequency domain resource is a frequency domain resource that occupies no less than a predetermined ratio of the total bandwidth of the unlicensed carrier. For example, the predetermined ratio is 80%, and adopting the predetermined ratio may satisfy the current regulatory requirement for transmitting information on the unlicensed carrier.

Alternatively, the PRB occupied by the second time-frequency resource in the frequency domain and the PRBs occupied by the time-frequency resources for transmitting the preambles of other UEs than the UE in the frequency domain occupy the entire preset frequency domain resource at a first predetermined frequency domain interval. Alternatively, the PRB occupied by the second time-frequency resource in the frequency domain is duplicated into multiple copies, and the multiple copies of PRB occupy the entire preset frequency domain resource at a second frequency domain interval. Alternatively, the PRB occupied by the second time-frequency resource in the frequency domain is duplicated into multiple copies, and the multiple copies of PRB occupy the entire preset frequency domain resource continuously. Alternatively, the interval of the subcarriers of the PRB is modified to cause the PRB occupied by the second time-frequency resource in the frequency domain to occupy the entire preset frequency domain resource. Alternatively, the preamble is encoded according to a specific encoding rule to cause the PRB occupied by the second time-frequency resource for transmitting the preamble in the frequency domain to occupy the entire preset frequency domain resource. Through any of the above ways, the total bandwidth occupied by transmitting the uplink information on the unlicensed carrier may be no less than the predetermined ratio, so as to satisfy the relevant regulatory requirements.

Alternatively, the first time-frequency resource or the second time-frequency resource is determined by at least one of the following ways: high-layer RRC signaling, physical layer DCI signaling, a predefined manner, previously determined by the base station and UE; and the LBT completed time.

Alternatively, the total occupied bandwidth of the second time-frequency resource occupied for transmitting the preamble which satisfies the regulatory requirement of the unlicensed carrier being no less than a predetermined ratio includes at least one of the following:

frequency domain resources occupied by each user equipment are the same, and a specified frequency domain interval is reserved between every two second time-frequency resources;

the second frequency domain resource is repeatedly transmitted N times in the frequency domain;

the second frequency domain resource is repeatedly transmitted N times in the frequency domain and a specified frequency domain interval is provided between every two times of transmission;

the user equipment transmits the preamble code according to a specified frequency domain pattern; and a method for modifying a subcarrier interval is employed.

Alternatively, the subcarrier interval includes one of the following: 1.25 kHz, 2.5 kHz, 3.75 kHz, 5 kHz, 7.5 kHz, 10 kHz, 15 kHz, 20 kHz, 30 kHz, 60 kHz and 120 kHz.

Through the above description of the embodiments, those skilled in the art can clearly understand that the method according to the above embodiments may be implemented by software in combination with a necessary universal hardware platform, and certainly may also be implemented by hardware. However, in many cases, the former is a preferred implementation. Based on this understanding, the technical solution of the present disclosure essentially, or the part contributing to the prior art, may be embodied in the form of a software product stored on a storage medium such as a ROM/RAM, a magnetic disk, and an optical disc, including several instructions to enable a terminal device (which may be a mobile phone, a computer, a server, or a network device, etc.) to perform the method of the embodiments of the present disclosure.

In the embodiment, a preamble transmission apparatus which is applied to a UE is also provided. The apparatus is configured to implement the foregoing embodiments and preferred implementations, and details have been described will not be repeated again. As used below, the term "module" may be a combination of software and/or hardware that achieves a predetermined function. Although the apparatus described in the following embodiments is preferably implemented in software, the implementation of hardware or a combination of software and hardware is also possible and contemplated.

Figure 2:
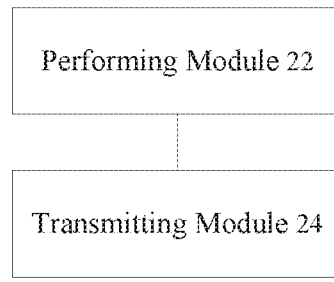
FIG. 2 is a block diagram of a preamble transmission apparatus according to an embodiment of the present disclosure.

FIG. 2 is a block diagram of a preamble transmission apparatus according to an embodiment of the present disclosure. As shown in FIG. 2, the apparatus includes a performing module 22 and a transmitting module 24. The performing module 22 is configured to perform a LBT on a first time-frequency resource of an unlicensed carrier until a right to use the unlicensed carrier is obtained, the LBT including a LBT performed for transmitting a preamble. The transmitting module 24 is coupled to the performing module 22 and configured, after the right to use the unlicensed carrier is obtained, for the UE to transmit a preamble on a second time-frequency resource after the first time-frequency resource; the second time-frequency resource being a time-frequency resource of a PRACH at a preconfigured fixed position, or a PRACH time-frequency resource determined according to the position for performing the LBT.

Alternatively, the first time-frequency resource includes one of: an OFDM symbol or multiple OFDM symbols before the second time-frequency resource; and one subframe or multiple sub-frames before the second time-frequency resource. The second time-frequency resource includes one sub-frame or multiple sub-frames or one OFDM symbol or multiple OFDM symbols.

Alternatively, in the case that the first time-frequency resource is one sub-frame or multiple sub-frames before the second time-frequency resource, the first time-frequency resource includes one of: the last OFDM symbol or the last multiple OFDM symbols of one sub-frame before the second time-frequency resource; and all or a part of OFDM symbols of multiple sub-frames before the second time-frequency resource.

Figure 3:
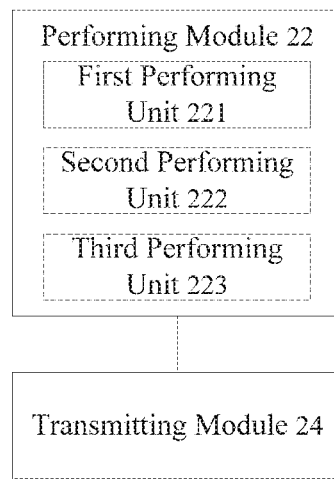
FIG. 3 is a first block diagram of an alternative preamble transmission apparatus according to an embodiment of the present disclosure.

FIG. 3 is a first block diagram of an alternative preamble transmission apparatus according to an embodiment of the present disclosure. As shown in FIG. 3, alternatively, the performing module 22 includes: a first performing unit 221, configured: in the case that the first time-frequency resource is one OFDM symbol, for the UE to perform a first LBT over a first time period within said one OFDM symbol, the first LBT being a LBT performed for transmitting the preamble; or, in the case that the first time-frequency resource is multiple OFDM symbols, for the UE to perform the first LBT over a first time period within the first OFDM symbol of the multiple OFDM symbols or within the multiple OFDM symbols; or, in the case that the first time-frequency resource is one sub-frame, for the UE to perform the first LBT over a first time period within the first OFDM symbol of said one sub-frame or within said one sub-frame; or, in the case that the first time-frequency resource is multiple subframes, for the UE to perform the first LBT over a first time period within the first OFDM symbol of the multiple subframes or within the first sub-frame of the multiple subframes or within the multiple sub-frames.

Alternatively, the performing module 22 may further include a second performing unit 222, configured: in the case that the first time-frequency resource is one OFDM symbol, for the UE to perform a second LBT over a second time period within said one OFDM symbol, the second LBT being a LBT performed for transmitting a sounding reference signal (SRS); or, in the case that the first time-frequency resource is multiple OFDM symbols, for the UE to perform the second LBT over a second time period within the second OFDM symbol of the multiple OFDM symbols or within the multiple OFDM symbols; or, in the case that the first time-frequency resource is one sub-frame, for the UE to perform the second LBT over a second time period within the second OFDM symbol of said one sub-frame or within said one sub-frame; or, in the case that the first time-frequency resource is multiple sub-frames, for the UE to perform the second LBT over a second time period within the second OFDM symbol of the multiple sub-frames or within the second sub-frame of the multiple sub-frames or within the multiple sub-frames.

Alternatively or additionally, the performing module 22 may further include a third performing unit 223, configured: in the case that the first time-frequency resource is one OFDM symbol, for the UE to perform a third LBT over a third time period within said one OFDM symbol, the third LBT being a LBT performed for transmitting a physical uplink shared channel (PUSCH); or in the case that the first time-frequency resource is multiple OFDM symbols, for the UE to perform the third LBT over a third time period within the third OFDM symbol of the multiple OFDM symbols or within the multiple OFDM symbols; or, in the case that the first time-frequency resource is one sub-frame, for the UE to perform the third LBT over a third time period within the third OFDM symbol of said one sub-frame or within said one sub-frame; or, in the case that the first time-frequency resource is multiple sub-frames, for the UE to perform the third LBT over a third time period within the third OFDM symbol of the multiple sub-frames or within the third sub-frame of the multiple sub-frames or within the multiple sub-frames.

Alternatively, the first OFDM symbol is an OFDM symbol before the second OFDM symbol, and the second OFDM symbol is an OFDM symbol before the third OFDM symbol. Alternatively, the first time period is a time period before the second time period, and the second time period is a time period before the third time period. Alternatively, the first sub-frame is a sub-frame before the second sub-frame, and the second sub-frame is a sub-frame before the third sub-frame.

Figure 4:
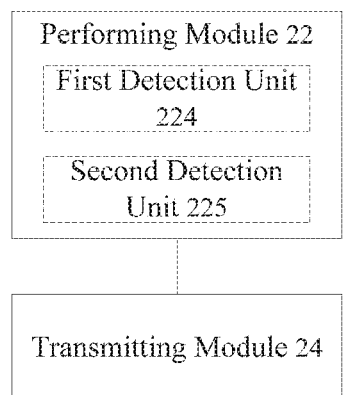
FIG. 4 is a second block diagram of an alternative preamble transmission apparatus according to an embodiment of the present disclosure.

FIG. 4 is a second block diagram of an alternative preamble transmission apparatus according to an embodiment of the present disclosure. As shown in FIG. 4, alternatively, the performing module 22 includes: a first detection unit 224 and/or a second detection unit 225. The first detection unit 224 is configured to perform one CCA detection or multiple CCA detections on the first time-frequency resource. The second detection unit 225 is configured to perform one eCCA detection or multiple eCCA detections on the first time-frequency resource.

Alternatively, the detection duration for the CCA detection is determined according to one of the following: pre-definition; DCI information of the base station; a parameter in the process of performing the LBT determined based on the frame structure or the UE scheduled condition or the time domain resource duration in the first time-frequency resource, and the duration corresponding to the parameter.

Alternatively, the detection duration of the CCA detection includes one of the following: 34 us, 25 us, 20 us, 18 us, 16 us, 10 us and 9 us.

Alternatively, in the case that the first detection unit 224 performs multiple CCA detections on the first time-frequency resource, the number of times for the first detection unit 224 performing the CCA detections may be preconfigured, or may be configured by the base station, or determined according to the following conditions: the time domain resource duration in the first time-frequency resource, and the detection duration for the CCA detection.

Figure 5:
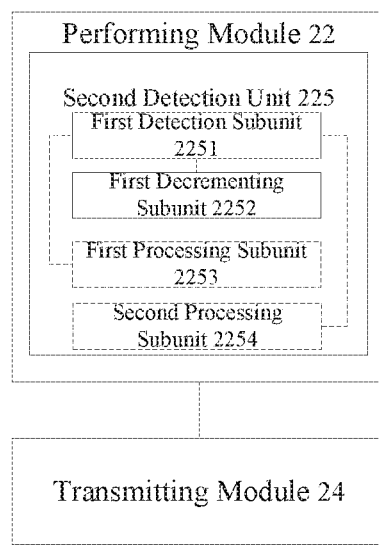
FIG. 5 is a third block diagram of an alternative preamble transmission apparatus according to an embodiment of the present disclosure.

FIG. 5 is a third block diagram of an alternative preamble transmission apparatus according to an embodiment of the present disclosure. As shown in FIG. 5, alternatively, the second detection unit 225 includes a first detection subunit 2251 configured to perform an eCCA detection on the first time-frequency resource to detect whether the unlicensed carrier is idle. The random rollback value N for the eCCA detection is a value selected in a given contention window, which is as small as possible. The eCCA detection process includes one or more random rollback CCA detections. The second detection unit 225 includes a first decrementing subunit 2252 coupled to the first detection subunit 2251 and configured to, in case that the unlicensed carrier is detected to be idle, perform a process of decreasing the value N; a first processing subunit 2253 coupled to the first detection subunit 2251 and configured to, in case that the unlicensed carrier is detected to be busy, repeatedly perform one of the following operations: performing directly the next random rollback CCA detection; or a second processing subunit 2253 coupled to the first detection subunit 2251 and configured to, in case that the unlicensed carrier is detected to be busy, repeatedly perform one of the following operations: entering a defer period, and performing a random rollback CCA detection after the defer period. When it is detected that the unlicensed carrier is idle and the value N is decreased to the target value, it indicates that the right to use the unlicensed carrier is obtained.

Figure 6:
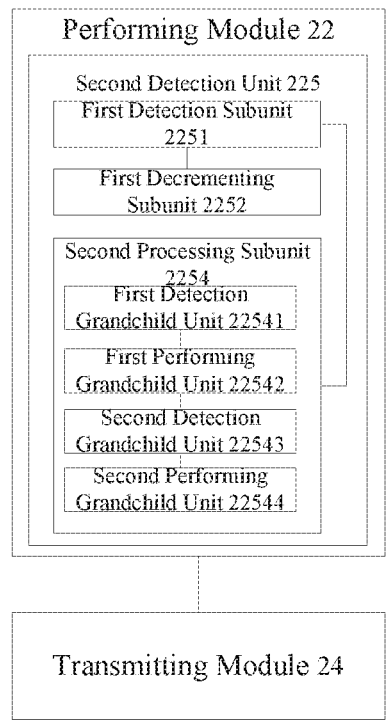
FIG. 6 is a fourth block diagram of an alternative preamble transmission apparatus according to an embodiment of the present disclosure.

FIG. 6 is a fourth block diagram of an alternative preamble transmission apparatus according to an embodiment of the present disclosure. As shown in FIG. 6, alternatively, the second processing subunit 2254 includes: a first detection grandchild unit 22541 configured to enter a defer period, and detect whether the unlicensed carrier is idle during the defer period; a first performing grandchild unit 22542 coupled to the first detection grandchild unit 22541 and configured to, when it is detected that the unlicensed carrier is idle in the defer period, perform the operation of decreasing the value N; a second detection grandchild unit 22543 coupled to first performing grandchild unit 22542 and configured to, after the operation of decreasing the value N is performed, determine whether the current value N is the target value, wherein if it is determined that the current value N is the target value, it indicates that the right to use the unlicensed carrier is obtained; and if it is determined that the current value N is not the target value, the random rollback CCA detection is performed; and a second performing grandchild unit 22544 configured to, when it is detected in the random rollback CCA detection that the unlicensed carrier is idle, perform the operation of decreasing the value N and determine whether the current value N is the target value, wherein if it is determined that the current value N is the target value, it indicates that the right to use the unlicensed carrier is obtained; and if it is determined that the current value N is not the target value, the next random rollback CCA detection is performed.

Figure 7:
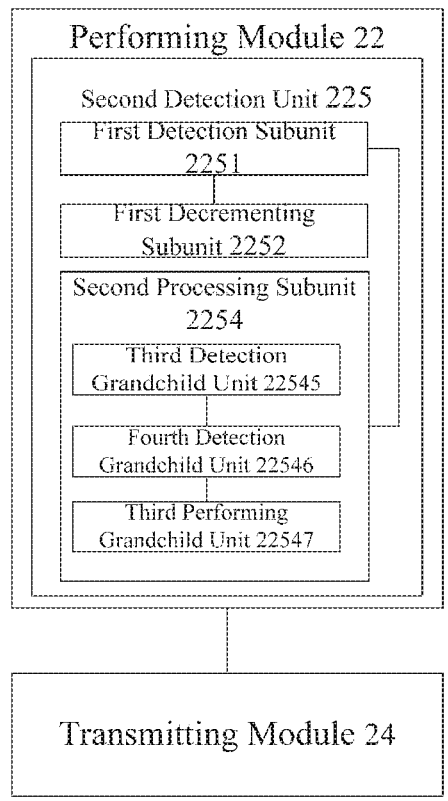
FIG. 7 is a fifth block diagram of an alternative preamble transmission apparatus according to an embodiment of the present disclosure.

FIG. 7 is a fifth block diagram of an alternative preamble transmission apparatus according to an embodiment of the present disclosure. As shown in FIG. 7, alternatively, the second processing subunit 2254 includes: a third detection grandchild unit 22545 configured to enter a defer period, and detect whether the unlicensed carrier is idle during the defer period; a fourth detection grandchild unit 22546 coupled to the third detection grandchild unit 22545 and configured, when it is detected that the unlicensed carrier is idle in the defer period, for the UE to end the defer period, freeze the value N in the defer period and perform a random rollback CCA detection; a third performing grandchild unit 22547 configured, when it is detected that the unlicensed carrier is idle in the random rollback CCA detection, for the UE to perform the operation of decreasing the value N and determine whether the current value N is the target value, wherein if it is determined that the current value N is the target value, it indicates that the right to use the unlicensed carrier is obtained; and if it is determined that the current value N is not the target value, the next random rollback CCA detection is performed.

Alternatively, the duration of the defer period includes one of the following: 34 us, 25 us, 20 us, 18 us, 16 us, 10 us, 9 us and 0 us.

Alternatively, the detection duration for the random rollback CCA includes one of the following: 10 us and 9 us.

Alternatively, the value N is determined according to one of the following ways: preconfigured, generated by the base station and randomly generated.

Alternatively, the PRB occupied by the second time-frequency resource in the frequency domain is transmitted on a preset frequency domain resource. The preset frequency domain resource is a frequency domain resource that occupies no less than a predetermined ratio of the total bandwidth of the unlicensed carrier.

Alternatively, the PRB occupied by the second time-frequency resource in the frequency domain and the PRBs occupied by the time-frequency resources for transmitting the preambles of other UEs than the UE in the frequency domain occupy the entire preset frequency domain resource at a first predetermined frequency domain interval. Alternatively, the PRB occupied by the second time-frequency resource in the frequency domain is duplicated into multiple copies, and the multiple copies of PRB occupy the entire preset frequency domain resource at a second frequency domain interval. Alternatively, the PRB occupied by the second time-frequency resource in the frequency domain is duplicated into multiple copies, and the multiple copies of PRB occupy the entire preset frequency domain resource continuously. Alternatively, the interval of the subcarriers of the PRB is modified to cause the PRB occupied by the second time-frequency resource in the frequency domain to occupy the entire preset frequency domain resource. Alternatively, the preamble is encoded according to a specific encoding rule to cause the PRB occupied by the second time-frequency resource for transmitting the preamble in the frequency domain to occupy the entire preset frequency domain resource.

Alternatively, the first time-frequency resource or the second time-frequency resource is determined by at least one of the following ways: high-layer RRC signaling, physical layer DCI signaling, a predefined manner, previously determined by the base station and UE, and the LBT completed time.

Alternatively, the total occupied bandwidth of the second time-frequency resource occupied for transmitting the preamble which satisfies the regulatory requirement of the unlicensed carrier being no less than a predetermined ratio includes at least one of the following:

frequency domain resources occupied by each user equipment is the same, and a specified frequency domain interval is reserved between every two second time-frequency resources;

the second frequency domain resource is repeatedly transmitted N times in the frequency domain;

the second frequency domain resource is repeatedly transmitted N times in the frequency domain and a specified frequency domain interval is provided between every two times of transmission;

the user equipment transmits the preamble code according to a specified frequency domain pattern; and a method for modifying a subcarrier interval is employed.

Alternatively, the subcarrier interval includes one of the following: 1.25 kHz, 2.5 kHz, 3.75 kHz, 5 kHz, 7.5 kHz, 10 kHz, 15 kHz, 20 kHz, 30 kHz, 60 kHz and 120 kHz.

It should be noted that, each of the foregoing modules may be implemented by software or hardware, and the latter may be implemented by, but not limited to, the foregoing modules being all located in the same processor; or the foregoing modules being respectively located in multiple processors.

Alternatively, for a specific example in the embodiment, reference may be made to the examples described in the foregoing embodiments and alternative implementations, and details are not described herein again in the embodiment.

In order to make the description of the embodiments of the present disclosure more comprehensible, the following describes the embodiments in combination with the alternative embodiments.

Apparatus in the LTE system (base station or UE) also need to meet the regulatory requirements of the unlicensed carrier for using the unlicensed carrier resource. That is, the apparatus needs to perform the LBT mechanism according to the regulatory requirement before using the unlicensed carrier for information transmission. Based on this, in an alternative embodiment of the present disclosure, the preamble code needs to be transmitted on the unlicensed carrier to adjust the uplink timing, and meanwhile, the LBT mechanism is performed before the preamble code is transmitted, in consideration of the regulatory requirements of the unlicensed carrier.

In order to solve the problems in the related art, embodiments of the present disclosure intend to provide a preamble transmission method on an unlicensed carrier, which is used to ensure that a base station receives, in an unlicensed carrier, a preamble transmitted by the UE to determine a TA value of the UE, such that uplink signals of different UEs in the same cell arrive at the base station simultaneously, so as to reduce inter-cell interference. In addition, the method of the present disclosure can also increase the probability that the UE transmits the Preamble.

In order to achieve the above objective, an alternative embodiment of the present disclosure provides a Preamble transmission method on an unlicensed carrier, where the method includes the following steps.

The UE transmits a Preamble to a base station (eNB) on one PRACH time-frequency resource (corresponding to the second time-frequency resource).

In this case, the UE performs the uplink LBT mechanism on a specific time-frequency resource (corresponding to the above first time-frequency resource) before the Preamble is transmitted, based on the time-frequency resource for transmitting the Preamble by the UE.

The position of the PRACH time-frequency resource includes: a position of the PRACH time-frequency resource determined based on an existing position of the PRACH time-frequency resource; or according to a predefined LBT performing position on an unlicensed carrier.

For example, the PRACH time-frequency resource for transmitting the Preamble is located in the first sub-frame after the resource position for performing the LBT in the uplink or the first two OFDM symbols in the first sub-frame.

The UE performs an uplink LBT on a specific time-frequency resource preceding the PRACH time-frequency resource for transmitting the Preamble. The specific time-frequency resource for performing the LBT includes:

A sub-frame before the PRACH time-frequency resource for transmitting the Preamble; or several OFDM symbols before the PRACH time-frequency resource for transmitting the Preamble; or a fixed LBT symbol of the PRACH time-frequency resource for transmitting the Preamble.

A sub-frame before the PRACH time-frequency resource for transmitting the Preamble includes: one sub-frame before the PRACH time-frequency resource for transmitting the Preamble; or several sub-frames before the PRACH time-frequency resource for transmitting the Preamble.

One sub-frame before the PRACH time-frequency resource for transmitting the Preamble includes: one last OFDM symbol in the sub-frame; or multiple last OFDM symbols in the sub-frame.

For the last one or more OFDM symbols in the sub-frame, the former part of the OFDM symbols may be taken as the position for the LBT performed for transmitting the Preamble, the middle part of the OFDM symbols as the position for the LBT performed for transmitting the SRS signal, and the latter part of the symbols as the position for the LBT performed for transmitting PUSCH.

The several sub-frames before the PRACH time-frequency resource for transmitting the Preamble include: a first part of resources before the PRACH time-frequency resource for transmitting the Preamble is the LBT position for the PUSCH; a second part of resources before the PRACH time-frequency resource for transmitting the Preamble is the LBT position for transmitting the SRS signal; and a third part of resources before the PRACH time-frequency resource for transmitting the Preamble is the LBT position for transmitting the Preamble.

The priority order of performing the LBT may be: Preamble>SRS>PUSCH. However, the LBT may also be performed in an order not limited to this priority order.

Alternatively, according to the number of symbols occupied by performing the uplink LBT which are obtained through the above steps, the UE may perform contention access in one of the following modes.

Mode 1: performing one CCA detection (e.g., initial CCA detection).

Mode 2: performing multiple CCA detections (e.g., initial CCA detection).

Mode 3: directly performing an eCCA process.

Mode 4: performing CCA+eCCA process.

Alternatively, in the CCA detection in the mode 1, the detection duration of the CCA (e.g., initial CCA detection) may be configured to one of the following: 34 us, 25 us, 20 us, 18 us, 16 us, 9 us or 10 us. The duration of the CCA is related to the frame structure, the scheduling of the UE, the duration of the time domain resource configured for the user equipment UE to perform the LBT, and the contention fairness of the different systems. Determining whether the CCA detection is successfully passed based on one of the following: when the detection channel has been idle throughout the CCA detection duration, it is regarded as the user equipment successfully obtains by contention the right to use the unlicensed carrier.

Alternatively, in the multiple CCA detections in the mode 2, the detection duration of CCA (e.g., initial CCA detection) may be configured with reference to the duration in the mode 1, and the mode 2 is composed of multiple CCA detections in the mode 1. The number of the CCA detections is related to the duration of the time domain resource configured for the user equipment UE to perform the LBT and the duration for performing one CCA detection. For example, the number of times of the CCA detections is equal to a round down value obtained by dividing the duration of the time domain resource configured for the user equipment UE to perform the LBT by the duration for performing one CCA detection. Alternatively, the number of the CCA detections may also be configured or predetermined by the base station. The positions for the multiple CCA detections may be continuous with each other, discontinuous or overlapped with each other, and each CCA detection position may be randomly selected within the configured time period (for example, dividing the configured time period for performing the LBT into multiple time segments according to the detection duration in advance). Further, the position of the CCA detection may be dynamic (that is, the node detecting channel is changed from busy to idle, and when the continuous time period while the detection channel is idle meets the preset CCA detection time, it is considered that the right to use the unlicensed carrier is obtained).

Alternatively, in the direct eCCA process in the mode 3, the eCCA process consists of multiple random rollback CCA detections. In general, random rollback CCA detection duration is set to 9 us or 10 us, but the duration configuration is not limited to this.

The UE performs CCA detection on the time domain resource configured for performing the LBT (where the CCA detection refers to the CCA detection during the eCCA random rollback process), and if it is determined as idle, the UE performs an operation of decreasing the value N by a preset number. Otherwise, if it is determined as busy, the UE may perform one of the following operations.

Operation 1: the UE performs the next CCA detection directly. If it is always busy, the CCA detection is repeatedly performed. Until it is detected that the channel is idle and the value N is decreased to a target value (for example, 0), it is considered that the user equipment successfully obtains by contention the right to use the unlicensed carrier.

Operation 2: The UE enters the Defer Period. The duration of the defer period may be configured to one of the following: 34 us, 25 us, 20 us, 18 us, 16 us, 9 us or 10 us, or 0 us (i.e., the defer period is configured as 0).

During the defer period, one of two following processes may be performed.

Process 1: When the UE detects that the channel is idle during the defer period, the UE is allowed to perform the operation of decreasing the value N by the preset number. If it is determined that the decreased value N is not 0, the UE performs the next CCA detection. If the channel is idle in the CCA detection, the UE performs the operation of decreasing the value N by the preset number. If it is busy, then the defer period is entered to repeat the operation of the process 1. Until it is detected that the channel is idle and the value N is decreased to 0, it is considered that user equipment successfully obtains by contention the right to use the unlicensed carrier.

Process 2: When the UE detects that the channel is idle during the defer period, the UE performs the next CCA detection. If the channel is idle in the CCA detection, the UE performs the operation of decreasing the value N by the preset number. If it is busy, then the defer period is entered to repeat the operation of the process 2. Until it is detected that the channel is idle and the value N is decreased to 0, it is considered that user equipment successfully obtains by contention the right to use the unlicensed carrier.

The value N may be obtained through base station configuration, randomly generated, or preset.

Alternatively, in the CCA+eCCA detection process with a small N described in the mode 4, the CCA is the same as that in the mode 1, and the eCCA process is the same as that in the mode 3. It may be determined how much the value N is appropriate according to the time domain resource duration configured for the UE to perform the LBT. A short eCCA process performs a random rollback LBT process with a relatively small value N.

Alternatively, the configuration information of the PRACH for the TDD system indicates a certain specific configuration by the parameters "prach-configurationIndex" and "UL/DL configuration", which are accurate to the sub-frame level. The value of "prach-ConfigurationIndex" is determined by the "prach-ConfigIndex" or "PRACH Mask Index" configured by the upper layer. Prach-ConfigIndex is a broadcast configuration, and the PRACH Mask Index is configured for a single UE. The "UL/DL configuration" is used to configure the uplink and downlink sub-frame configuration of the TDD system. Each determined PRACH is determined by a parameter ($f_{RA}$, $t_{RA}^{(0)}$, $t_{RA}^{(1)}$, $t_{RA}^{(2)}$), where $f_{RA}$ denotes an index of a position of a frequency domain resource where the PRACH is located; $t_{RA}^{(0)}$ denotes an index of a frame number where the PRACH is located; $t_{RA}^{(1)}$ denotes an index of a half-frame where the PRACH is located; and $t_{RA}^{(2)}$ denotes an index number of an uplink sub-frame where the PRACH is located. For FDD, the configuration information of the PRACH indicates a specific configuration by the parameter "prach-configurationIndex", which is accurate to the sub-frame level. The value of "prach-ConfigurationIndex" is determined by the "prach-ConfigIndex" or "PRACH Mask Index" configured by the upper layer.

Alternatively, the LBT is different for non-contention based random access and contention based random access. The non-contention-based PRACH has a higher priority. For example, the non-contention-based PRACH LBT mechanism, the UE may directly PRACH without performing CCA detection or by only performing the CCA detection, or by selecting smaller parameters correspondingly or lower CCA detection threshold and other means. The priority of the contention-based PRACH is lower than that of the non-contention mode, and the corresponding LBT process is also relatively complicated, for example, adopting the LBT method with the CCA+eCCA detection.

Alternatively, a guard interval is added between performing LBT and transmitting PRACH. If the time for completing the LBT has not reached to the position of the resource for transmitting the PRACH, the UE needs to send a reserved signal for occupying the channel. Also, it can also implement code division multiplexing of the PRACH (the multiplexing method is as follows: for an UE or a base station completing the LBT, on the time domain resource for detecting the CCA by the UE, an occupancy signal is sent on a part of the frequency domain, and other UEs perform CCA on the idle frequency domain and perform signal recognition or energy sensing in a non-idle frequency domain. When both of them are true, the resources can be used. In this way, the multiplexing may be well achieved, and it can also solve the problem of hidden nodes). In addition, the CP of the PRACH can be combined with the occupancy signal, and the GP of the PRACH has influence on the CCA detection position of other UEs or base stations.

Alternatively, in the related art, the frequency domain resources of the PRACH are 6 consecutive PRB resources in the frequency domain and cannot meet the regulatory requirement that the information to be transmitted on an unlicensed carrier must account for 80% of the bandwidth. Therefore, it may be implemented by one of the following solutions.

Solution 1: The UE occupies 6 PRBs in the frequency domain, and at certain frequency domain interval, another UE occupies 6 continuous PRBs, which in turn occupy 80% of the total bandwidth.

Solution 2: The UE occupies 80% of the total bandwidth at a certain frequency domain interval.

Solution 3: The UE continuously occupies 80% of the total bandwidth resources.

Solution 4: The subcarrier interval is modified such that the frequency domain resources occupied by the PRACH occupy 80% of the total bandwidth.

In the following, alternative embodiments of the present disclosure will be described and illustrated with reference to the accompanying drawings.

Alternative Embodiment One

Figure 8:
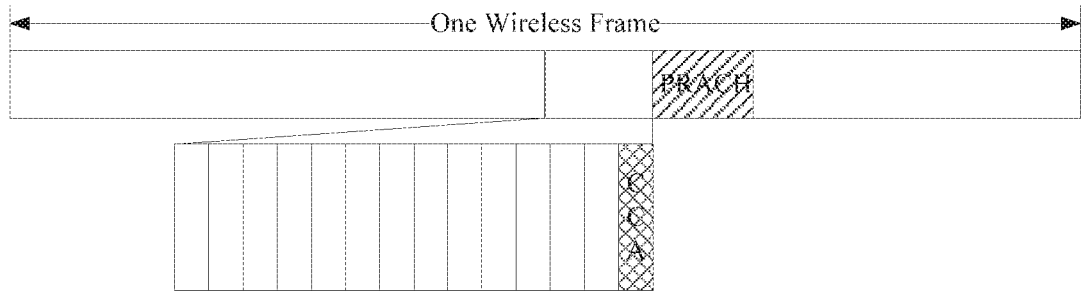
FIG. 8 is a first schematic diagram of positions of a first time-frequency resource and a second time-frequency resource according to an alternative embodiment of the present disclosure.

FIG. 8 is a first schematic diagram of locations of a first time-frequency resource and a second time-frequency resource according to an alternative embodiment of the present disclosure. As shown in FIG. 8, the position of PRACH resource (corresponding to the above second time-frequency resource) is not changed. The position of the resource (corresponding to the above first time-frequency resource) for performing the LBT mechanism by the UE is at the position of the last OFDM symbol of the previous sub-frame of the PRACH resource.

In the present alternative embodiment, a description will be made taking as an example that a Preamble of a UE is transmitted on a specified PRACH resource according to the fixed position of the PRACH resource specified in the existing standard. In accordance with the regulatory requirements for unlicensed carriers, the LBT mechanism should be performed before the uplink needs to transmit information on the unlicensed carrier.

As shown in FIG. 8, for the uplink, the LBT mechanism needs to be performed before the UE transmits the Preamble on the PRACH resource on the unlicensed carrier. In the present alternative embodiment, it is assumed that the position of the LBT required to be performed to transmit the Preamble by the UE is immediately after the PRACH resource, that is, the last OFDM symbol of the previous sub-frame of the sub-frame in which the PRACH resource is located. Alternatively, it may also be the last OFDM symbol with a preset value of the previous sub-frame of the sub-frame in which the PRACH resource is located. The LBT mechanism that can be adopted in an OFDM symbol includes: LBT mechanism without random rollback or LBT mechanism with a short random rollback value N.

The UE obtains the position information for performing the LBT may be notified by a base station or by implicitly acquiring according to the allocated PRACH resource or by pre-configuration. The parameter information used by the UE for performing LBT may be notified by a base station or by implicitly acquiring the corresponding parameter for performing the LBT according to the time domain resource configured for the user equipment to perform the LBT or by acquiring a predetermined configuration.

The following describes the LBT mechanism that can be adopted within one OFDM symbol (the method described in the embodiment is also applicable to a case of configuring multiple symbol times for performing LBT).

If the base station side has successfully obtained the right to use the unlicensed carrier, the UE may use the LBT mechanism without random rollback to access by contention at the PRACH LBT position before transmitting the Preamble, so as to implement a fast access channel.

For example, one CCA detection is performed according to the mode 1. The CCA detection duration may be configured to one of the following: 34 us, 25 us, 20 us, 18 us, 16 us, 9 us or 10 us. The default value is 34 us.

Alternatively, according to the method for multiple CCA detections described in the mode 2. That is, within a configured OFDM symbol time, the number of times of CCA performed may be obtained as negotiated in advance, or obtained directly according to the configured LBT performing duration and one CCA detection duration. If the CCA detection is performed for the first time and the channel is busy, the UE continues to perform the next CCA detection until it is detected that the channel is idle within the allowed number of times of CCA detection. Then, it is considered that the unlicensed carrier is successfully obtained, and the Preamble may be transmitted on the resources corresponding to the PRACH. Alternatively, when the channel is busy during the CCA detection time, as long as the channel is changed from busy to idle and the continuous time period while the channel is detected as idle meets the preset CCA detection duration, it is also considered that the unlicensed carrier is obtained successfully. For the multiple CCA detections performed within one OFDM symbol in mode 2, the CCA detection durations are 34 us, 25 us, and 20 us respectively. Then, according to the corresponding CCA detection durations, the number of times of CCA that can be performed within one OFDM symbol are respectively: 2, 2 and 3. In addition, the positions of the multiple CCA detections may be continuous with each other, or may be discontinuous or overlapping with each other.

However, when the UE per se performs preemption of the unlicensed carrier or the UE performs the preemption of the unlicensed carrier based on the UL Grant (transmitted by the base station on the licensed carrier) transmitted by the base station, the UE may access by contention at the PRACH LBT position before transmitting the Preamble with the random rollback LBT mechanism, thus improving the chance of access to the channel.

For example, in the eCCA detection process described in the mode 3, when it is detected that the channel is busy and, the defer cycle (i.e., defer period) detection is performed. The duration is configured as 0, or it is allowed to perform an operation of decreasing the value N when it is detected that the channel is idle in a configured defer cycle duration. After it is detected that the channel is idle for one time, the user equipment may perform an operation of decreasing the value N by a preset number. Since a symbol has a relatively short time period, the number by which the value N is decreased each time may be flexibly selected according to the size of the value N. For example, the number by which the value N is decreased may be larger than 1 (for quickly obtaining the right to use the unlicensed carrier within the time period of one OFDM symbol), but not limited thereto.

For the case that the UE has successfully obtained the right to use the unlicensed carrier according to the obtained LBT performing method before the end of the time period of one symbol, the UE may transmit a reserved signal which is not a complete OFDM symbol between boundaries of OFDM symbols at the time when the UE successfully obtains by contention the unlicensed carrier, for occupying the channel. It is also possible to reserve a certain guard interval between the LBT and the PRACH resource for transmission.

Alternative Embodiment Two

Figure 9:
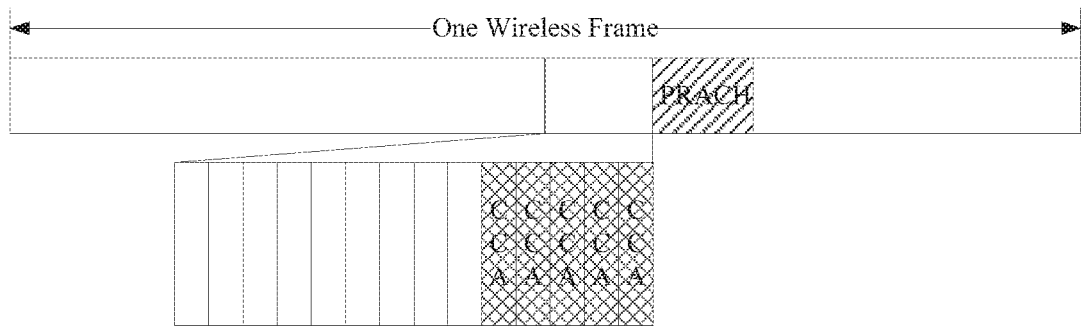
FIG. 9 is a second schematic diagram of positions of a first time-frequency resource and a second time-frequency resource according to an alternative embodiment of the present disclosure.

FIG. 9 is a second schematic diagram of positions of a first time-frequency resource and a second time-frequency resource according to an alternative embodiment of the present disclosure. As shown in FIG. 9, the position of the PRACH resource is not changed. The position for performing the LBT mechanism by the UE is at the position of the last multiple symbols of the previous sub-frame of the PRACH resource.

As shown in FIG. 9, it is assumed that the position of the LBT configured by the base station for the UE is located in the last 5 symbols (the total duration of the 5 OFDM symbols is about 355 us) of the previous sub-frame of the PRACH resource, or the UE performs LBT at the last 5 symbols of the previous sub-frame of the PRACH resource as negotiated in advance. The method is applied to the situation that the PRACH is transmitted for the first time and is favorable for improving the chance of successfully transmitting the UE Preamble.

According to the obtained PRACH time domain resource for performing LBT, the UE may access by contention using random rollback LBT mechanism. At this point, the LBT procedure with the CCA+eCCA detection includes the following steps.

In step 1, the UE performs CCA detection. If it is detected that the channel is idle, the UE acquires the right to use the unlicensed carrier. For fair coexistence with the Wi-Fi system, it is assumed that the CCA detection duration is 34 us. Since the right to use the unlicensed carrier is obtained successfully in only one CCA detection, during the remaining LBT configuration time, the following operations may be performed. Since the CCA detection completed time has not reached the boundary of the OFDM symbol, a reserved signal which is not a complete OFDM symbol may be transmitted in the remaining time within the OFDM symbol, and the SRS signal of the UE which successfully detects the unlicensed carrier (the SRS signal is transmitted at full-bandwidth or at a specific frequency domain pattern), or a reserved signal for identifying users in the same cell (the reserved signal carrying the identification information is transmitted at full-bandwidth, or the reserved signal for identification is transmitted at a specific frequency domain pattern), is transmitted within the remaining 4 OFDM symbols. The user equipment which is successful in the contention may transmit the SRS signal on the remaining OFDM symbols by time division, frequency division or code division.

Alternatively, if the CCA detects that the channel is busy, the UE enters a defer period.

In step 2, it is detected that the channel is busy, the UE enters the defer period. The duration of the defer period may be configured to one of the following: 34 us, 25 us, 20 us, 18 us, 16 us, 9 us or 10 us, or 0 us (the defer period is configured as 0).

During the defer period, one of the following two operations may be performed.

Operation 1: When the UE detects that the channel is idle during the defer period, the UE is allowed to perform the operation of decreasing the value N by the preset number. If it is determined that the decreased value N is not 0, the UE proceeds to an eCCA random rollback process (the eCCA random rollback is composed of multiple CCA processes). That is, the UE enters the CCA detection. If the channel is idle in the CCA detection, the UE performs the operation of decreasing the value N by the preset number. If it is busy, then the defer period is entered to repeat the operation 1. Until it is detected that the channel is idle and the value N is decreased to 0, it is considered that user equipment successfully obtains by contention the right to use the unlicensed carrier.

Operation 2: When the UE detects that the channel is idle during the defer period, the UE directly proceeds to an eCCA random rollback process (the eCCA random rollback is composed of multiple CCA processes), that is, the UE enters the CCA detection. It means that the value N is frozen in the defer period. If the channel is idle in the CCA detection, the UE performs the operation of decreasing the value N by the preset number. If it is busy, then the defer period is entered to repeat the operation 2. Until it is detected that the channel is idle and the value N is decreased to 0, it is considered that user equipment successfully obtains by contention the right to use the unlicensed carrier.

The value N may be obtained through base station configuration, randomly generated, or preset.

Here, assuming that the value N is 6, when the CCA detects that the channel is busy, the UE enters a defer period. If it detects that the channel is idle during the defer period, the user equipment performs an operation of decreasing the value N by a preset number. In the present embodiment, the preset number for the decreasing is 1, and the value N after the decreasing is 6−4=2 (the operation of decreasing by 4, since in the configured defer period, during the default 34 us, CCA detections for a duration of 9 us may be performed for 4 times). Once it is detected that the channel is idle during the defer period, an operation of decreasing N by 4 is performed.

Alternatively, the UE determines whether the decreased value N is 0, and if the determination result is 0, the user equipment obtains the right to use the unlicensed carrier. At this point, the time domain duration configured for the UE to perform the PRACH LBT is a total duration of about 5 OFDM symbols (about 355 us), decreasing by the CCA durations (34 us) and the defer period (34 us), the result is about 287 us (i.e., the remaining 4 OFDM symbols). Therefore, the operations may be performed during the remaining LBT configuration time are as follows. Within the remaining 4 OFDM symbols, the UE that successfully detected the unlicensed carrier transmits the SRS signal or a reserved signal for identifying users in the same cell (the reserved signal carrying the identification information is transmitted at full-bandwidth, or the reserved signal for identification is transmitted at a specific frequency domain pattern). The user equipment which is successful in the contention may transmit the SRS signal on the remaining OFDM symbols by time division, frequency division or code division.

On the other hand, if the determining result is not 0, the eCCA random rollback process is entered. After the defer period detection is completed, a single CCA detection is performed (in which, in order to correspond to the random rollback process of the Wi-Fi system, the duration of a single CCA detection may be configured to 9 us or 10 us). If it is detected that the channel is idle, the user equipment performs the operation of decreasing the value N by a preset number. In this case, the preset number for the decreasing is 1, and the decreased value N is 2−1=1. Then it is determined whether the current decreased value N is 0. The above operation is repeated until the N is decreased to 0, and then it is considered that the UE obtains the right to use the unlicensed carrier. If the time when it is successful detected the right to use the unlicensed carrier does not reach the time domain boundary configured for the PRACH LBT, the above reserved signal may also be transmitted, and the reserved signal may be the SRS signal, in order to occupy the channel, and allow the base station to perform channel measurement earlier, and to facilitate other UEs to perform CCA detection so as to achieve PRACH code division multiplexing.

On the other hand, if at the time domain boundary configured for the PRACH LBT, the UE still fails to acquire the right to use the unlicensed carrier, the UE abandons transmitting Preamble on the time-frequency resource for transmitting the PRACH.

Alternative Embodiment Three

Figure 10:
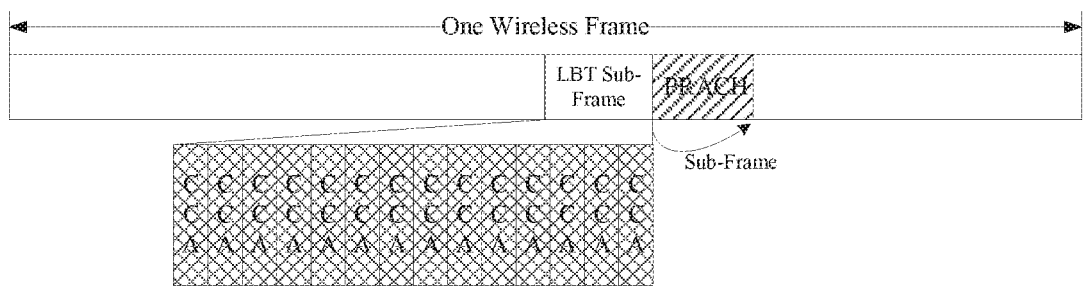
FIG. 10 is a third schematic diagram of a position of a first time-frequency resource and of a second time-frequency resource according to an alternative embodiment of the present disclosure.

FIG. 10 is a third schematic diagram of a position of a first time-frequency resource and of a second time-frequency resource according to an alternative embodiment of the present disclosure. As shown in FIG. 10, the position of PRACH resource is not changed. The previous sub-frame of the PRACH resource is configured as a PRACH LBT sub-frame.

This embodiment is different from the alternative embodiment two in that a LBT sub-frame is configured before the PRACH resource is transmitted, dedicated for improving the Preamble transmission by the UE. The process of performing the LBT in the dedicated PRACH LBT sub-frame may adopt the method in the alternative embodiment two, which will not be repeated herein.

Alternative Embodiment Four

Figure 11:
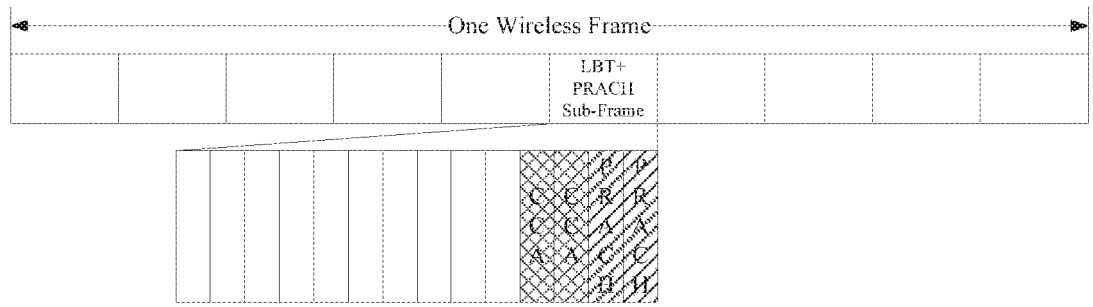
FIG. 11 is a fourth schematic diagram of the positions of the first time-frequency resource and the second time-frequency resource according to an alternative embodiment of the present disclosure.

FIG. 11 is a fourth schematic diagram of the positions of the first time-frequency resource and the second time-frequency resource according to an alternative embodiment of the present disclosure. As shown in FIG. 11, the position for the UE performing LBT to transmit the Preamble and the PRACH resource are in the same sub-frame.

When the position at which the UE performs the uplink LBT before transmitting the Preamble and the PRACH resource for transmitting the Preamble are in the same sub-frame, the following is performed in performing the uplink LBT and transmitting the Preamble:

For the resource for performing the uplink LBT before transmitting the Preamble, one of the following may be adopted. The uplink LBT occupies one OFDM symbol of the sub-frame; or the uplink LBT occupies multiple OFDM symbols of the sub-frame. The last two OFDM symbols of the sub-frame are vacant, and are used to transmit the Preamble after the LBT is completed. The uplink LBT transmits the Preamble at the previous one symbol other than the two OFDM symbols for transmitting the Preamble in the sub-frame or the first available resource of one sub-frame after the LBT is completed when one or several OFDM symbols are used for access by contention.

For the PRACH resource for transmitting the Preamble, in the existing standard, the PRACH format 0 to 4 respectively occupy one sub-frame, two sub-frames, two sub-frames, three sub-frames in the time domain and two OFDM symbols in the uplink pilot time slot (UpPTS).

Alternatively, it can be seen from FIG. 11 that the resource for transmitting the Preamble and the LBT before transmitting the Preamble are in the same sub-frame. In this case, the Preamble transmission cannot completely occupy the time domain resource of one sub-frame. Therefore, only the PRACH Format4 may be selected, or the PRACH resource is modified for the Preamble transmission with a resource less than one sub-frame.

For the above special uplink sub-frame, the time domain position for transmitting the Preamble code is UpPTS in the special sub-frame, and the position for performing LBT before transmitting the Preamble may be the last one or more OFDM symbols in the guard intervals (GPs) in the special sub-frame. At this time, the UE may perform LBT (e.g., regular LBT and Fast LBT) on GPs in the special sub-frame. The UE may perform uplink LBT by one of the following Fast LBT.

Mode 1: performing one CCA detection.
Mode 2: performing multiple CCA detections.
Mode 3: directly performing an eCCA process.
Mode 4: performing CCA+eCCA process.

For uplink non-special sub-frames, if the position configured for performing uplink LBT is located in the last several sub-frames other than the symbols configured for the PRACH resource in the uplink sub-frame, it is assumed that the time domain position for transmitting the Preamble code is the last two OFDM symbols of the sub-frame, and then, the LBT position before transmitting the Preamble may be the last third OFDM symbol in the sub-frame, or last third to the $M^{th}$ OFDM symbols in the sub-frame (M≥3). In FIG. 11, M is the fourth OFDM symbol (that is, the LBT performed for transmitting the Preamble occupies the last third to the last fourth OFDM symbols in the sub-frame). Similarly, the LBT before transmitting the Preamble may be performed according to the modes for the above special sub-frame, but not limited to the fast LBT method for access a channel by contention. After the LBT is completed, the Preamble is transmitted.

Alternatively, an offset may also be added after the fixed Preamble resource. In this case, it is not limited to that the Preamble is transmitted at the last two OFDM symbols or using a short PRACH resource (that is, less than one sub-frame or several OFDM symbols), and a fixed Preamble resource offset is possible according to the result of performing LBT. For example, if at the end of the position configured for LBT, the LBT still detects that the channel is busy or the right to use the unlicensed carrier is not obtained, the Preamble resource offset is performed, for the LBT continue to perform detection until the right to use the unlicensed carrier is obtained. Then, the Preamble is transmitted. The amount for the Preamble resource offset may be determined according to the number of times that the previous times of LBT is performed successfully or a preset offset amount or according to the performing of the LBT process.

Alternative Embodiment Five

Figure 12:
FIG. 12 is a schematic diagram of priority of configuring PRACH, SRS and PUSCH to perform LBT according to an alternative embodiment of the present disclosure.

FIG. 12 is a schematic diagram of priority of configuring PRACH, SRS and PUSCH to perform LBT according to an alternative embodiment of the present disclosure. As shown in FIG. 12, it shows the priority order of PRACH, SRS signals and PUSCH performing LBT before transmitting on the unlicensed carrier. The number of OFDM symbols occupied by configuring PRACH, SRS and PUSCH to perform LBT may be one of the following.

Before transmitting the PRACH and/or the SRS and/or the PUSCH, the resource for performing LBT for PRACH, resource for performing LBT for transmitting SRS signal and for performing LBT before transmitting PUSCH are configured sequentially to respectively occupy one OFDM symbol, as shown in FIG. 12. Alternatively, the previous sub-frame for transmitting the PRACH and/or the SRS and/or the PUSCH is configured as the LBT sub-frame. The number of OFDM symbols occupied for performing LBT in transmitting PRACH, SRS and PUSCH may be determined according to the priority order of PRACH, SRS and PUSCH.

In the following, it is assumed that the priority order of transmitting PRACH, SRS and PUSCH is: PRACH>SRS>PUSCH (the present embodiment is only one example, but the priority among the three is not limited thereto). Performing the PRACH LBT, the SRS LBT and the PUSCH LBT respectively occupies one OFDM symbol (the PRACH LBT position is located at the foremost of the three, and the PUSCH LBT position is located at the last of the three). The time domain resources occupied by the PRACH LBT, the SRS LBT and the PUSCH LBT are not limited to one OFDM symbol for each of them, and may also respectively occupy a segment of time domain resource, and may have a certain order of the time domain resource.

If the UE needs to transmit its own Preamble on the PRACH resource, the LBT process needs to be performed on the configured PRACH LBT resource. While the other UE needs to transmit the SRS signal, the UE can only perform the LBT that transmits the SRS signal on one OFDM symbol immediately after the PRACH LBT. Similarly, if the UE needs to perform data transmission, the user equipment needs to perform the LBT on the configured PUSCH LBT resource before transmitting the PUSCH. The UE herein may also be a UE group.

If the UE needs to transmit the Preamble, the UE performs the LBT according to the configured resource. If the UE obtains the right to use the unlicensed carrier successfully according to the corresponding LBT process, but not reach the resource for transmitting the Preamble, the UE needs to transmit a reserved signal, and the reserved signal may be transmitted according to a specific pattern in a frequency domain or a reserved signal carrying identification information at full bandwidth, for identifying a UE in the same cell or of the same operator, so as to multiplex the resource obtained by contention to transmit respective Preamble. Different fast LBT processes may be selected according to the resource configured for performing LBT, or the LBT process may be performed according to a parameter configured by the base station. If the priority of PRACH transmission is higher, a faster LBT process is preferred, for example, the only CCA, or with a smaller parameter (e.g., shorter duration or smaller value N), or, with lower threshold.

Performing LBT for transmitting SRS and PUSCH is the same as for transmitting PRACH as described above.

Alternatively, the foregoing PRACH LBT, SRS LBT, and PUSCH LBT are all performed in a time division manner. Similarly, the PRACH LBT, the SRS LBT, and the PUSCH LBT may also perform LBT separately on respective resource frequency domain patterns according to a frequency division manner. After the detection is successful, subsequent PRACH resources and SRS resources and the PUSCH may be used to transmit information. Its time domain can occupy one symbol or multiple symbols.

In the embodiment, the provided PRACH LBT, SRS LBT and PUSCH LBT perform CCA detection in a time-division manner according to a preset priority, so as to provide a higher contention access probability for transmitting information with a higher priority. However, the provided PRACH LBT, SRS LBT and PUSCH LBT perform LBT in a frequency-division manner according to the respective frequency domain CCA Pattern, which is beneficial for different UEs in the same cell to transmit respective information on the obtained resource by contention after performing LBT according to their different needs, further improving the efficiency of resource reuse.

Alternative Embodiment Six

Figure 13A:
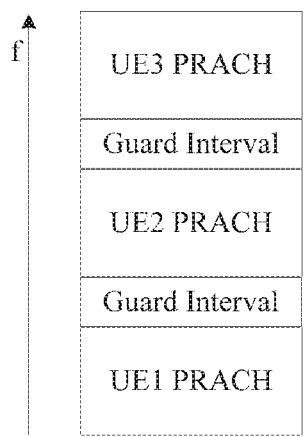
FIG. 13a to FIG. 13c are schematic diagrams of transmitting Preamble which occupies 80% of full bandwidth by the UE according to an alternative embodiment of the present disclosure.
Figure 13B:
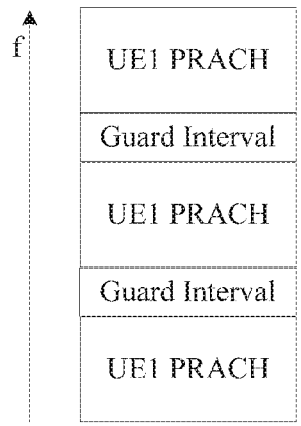
Figure 13C:
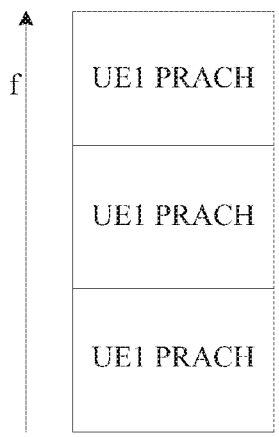

FIG. 13a to FIG. 13c are schematic diagrams of transmitting Preamble which occupies 80% of full bandwidth by the UE according to an alternative embodiment of the present disclosure.

According to the definition of the PRACH time-frequency resource in the existing standard, one PRACH resource occupies one sub-frame in the time domain and occupies 6 consecutive PRB resources in the frequency domain, which cannot meet the regulatory requirement that transmitting information on an unlicensed carrier should occupy 80% of the bandwidth. Therefore, after the UE obtains the unlicensed carrier by contention through corresponding LBT mechanism, when it needs to transmit the Preamble, the UE which obtains the right to use the unlicensed carrier may satisfy the regulatory requirement through one of the following solutions.

Solution 1: The UE occupies 6 PRBs in the frequency domain, and at certain frequency domain interval, another UE occupies 6 continuous PRBs, which in turn occupy 80% of the total bandwidth.

Solution 2: The UE occupies 80% of the total bandwidth according to a certain frequency domain interval.

Solution 3: The UE continuously occupies 80% of the total bandwidth resources.

Solution 4: The subcarrier interval is modified such that the frequency domain resources occupied by the PRACH occupy 80% of the total bandwidth.

For the solution 1, as shown in FIG. 13a, if there are multiple UEs that successfully obtain the right to use an unlicensed carrier using the same LBT contention mechanism, the UEs that obtain the right to use the unlicensed carrier may occupy 80% of the entire bandwidth on the PRACH sub-frames according to frequency division. Each UE transmits its own selected preamble on the corresponding PRACH resource, and reserves a guard interval of a certain frequency band between the frequency domain PRACH resources of the UEs in the frequency domain. With the solution 1, multiple UEs can transmit their own Preambles, which is beneficial for the base station to adjust uplink timing when detecting the transmission delay between UEs. It can also satisfy the requirement that information transmission occupying 80% of the full bandwidth.

As shown in FIG. 13b, when there is only one UE that obtains successfully the unlicensed carrier through the LBT mechanism, the UE may repeatedly transmit its own Preamble on the PRACH resources in the frequency domain to ensure that the transmitted information occupies the entire bandwidth 80% as requested. A certain guard interval is reserved between repeatedly transmitted PRACH resources.

For the solution 2, when the user equipment successfully obtains the right to use the unlicensed carrier through the LBT mechanism, the user equipment performs the Preamble transmission according to a certain frequency domain pattern on the corresponding PRACH resource to achieve the requirement of transmitting signal occupying 80% of the entire bandwidth.

For the solution 3, when the user equipment successfully obtains the right to use the unlicensed carrier through the LBT mechanism, the UE may continuously occupy the frequency domain resources in the PRACH resource and can also achieve the requirement of transmitting signal occupying 80% of the entire bandwidth, as shown in FIG. 13c.

Alternatively, according to the solution 4, after the user equipment successfully obtains the right to use the unlicensed carrier by contention, the user equipment may modify the subcarrier interval to achieve the regulatory requirement of transmitting signal occupying 80% of the entire bandwidth. The optional subcarrier intervals are: 1.25 kHz, 2.5 kHz, 3.75 kHz, 5 kHz, 7.5 kHz, 10 kHz, 15 kHz, 20 kHz, 30 kHz, 60 kHz, 120 kHz and so on.

In addition, the final sequence obtained from the existing Preamble sequence according to a specific coding rule can also meet the regulatory requirement that the transmitted signal occupy 80% of the entire bandwidth.

An embodiment of the present disclosure further provides software, which is used to perform the technical solution described in the above embodiments and preferred implementations.

An embodiment of the present disclosure further provides a storage medium. In the present embodiment, the above-described storage medium may be configured to store program code for performing the following steps.

In Step S102, a user equipment (UE) performs a LBT on a first time-frequency resource of an unlicensed carrier until a right to use the unlicensed carrier is obtained, the LBT including a LBT performed for transmitting a preamble.

In Step S104, after the right to use the unlicensed carrier is obtained, the UE transmits a preamble on a second time-frequency resource after the first time-frequency resource; the second time-frequency resource is a time-frequency resource of a Physical Random Access Channel (PRACH) at a preconfigured fixed position, or a PRACH time-frequency resource determined according to the position for performing the LBT.

Alternatively, in the embodiment, the above storage medium may include, but not limited to, a U disk, a read-only memory (ROM), a random access memory (RAM), a mobile hard disk, a magnetic disk or a compact disc and a variety of media that can store program code.

Apparently, those skilled in the art should understand that each module or each step of the present disclosure described above can be implemented by a general purposed computing device, which can be centralized on a single computing device or distributed on a network formed by multiple computing devices. Alternatively, they may be implemented with program code executable by a computing device such that they may be stored in storage for execution by a computing device. In some cases, they may be performed in a different order from the steps illustrated and described herein. Alternatively, they may be made into individual integrated circuit modules respectively, or a plurality of modules or steps are made into a single integrated circuit module. As such, the present disclosure is not limited to any specific combination of hardware and software.

The foregoing descriptions are merely preferred embodiments of the present disclosure and are not intended to limit the present disclosure. For those skilled in the art, the present disclosure may have various modifications and changes. Any modification, equivalent replacement, improvement, etc. within the spirit and principle of the present disclosure should be included in the protection scope of the present disclosure.

INDUSTRIAL APPLICABILITY

The above technical solutions provided in the embodiments of the present disclosure may be applied to a preamble transmitting process, where the UE performs the LBT on the first time-frequency resource of the unlicensed carrier until the right to use the unlicensed carrier is obtained, the LBT including a LBT performed for transmitting a preamble. After the right to use the unlicensed carrier is obtained, the UE transmits a preamble on a second time-frequency resource after the first time-frequency resource; the second time-frequency resource is a time-frequency resource of PRACH at a preconfigured fixed position, or a PRACH time-frequency resource determined according to the posi-

What is claimed is:

1. A preamble transmission method comprising:
performing, by a user equipment UE, a Listen Before Talk LBT on a first time-frequency resource of an unlicensed carrier until obtaining a right to use the unlicensed carrier, the LBT comprising a LBT performed for transmitting a preamble; and
after obtaining the right to use the unlicensed carrier, transmitting, by the UE, at least one of the preamble, a SRS, and a PUSCH on a second time-frequency resource located after the first time-frequency resource; or
after obtaining the right to use the unlicensed carrier, transmitting by the UE the preamble in a specific manner in frequency domain according to at least one of:
the preamble being transmitted by each user equipment in frequency domain, and a specified frequency domain interval being reserved between two second time-frequency resources or preambles,
the preamble being repeatedly transmitted N times in the frequency domain, and N preamble or second time-frequency resources in the frequency domain continuously,
the preamble being repeatedly transmitted N times in the frequency domain and a specified frequency domain interval being provided between two second time-frequency resources or preamble,
the user equipment transmitting the preamble according to a specified frequency domain pattern,
the preamble being transmitted according to modifying a subcarrier interval, and
a new preamble sequence being transmitted in the frequency domain, wherein the new preamble sequence is generated in a specific manner.

2. The method according to claim 1, wherein the first time-frequency resource comprises one of:
one orthogonal frequency division multiplexing OFDM symbol or multiple OFDM symbols before the second time-frequency resource; and
one sub-frame or multiple sub-frames before the second time-frequency resource; wherein the second time-frequency resource comprises one sub-frame or multiple sub-frames or one OFDM symbol or multiple OFDM symbols.

3. A preamble transmission method comprising:
performing, by a user equipment UE, a Listen Before Talk LBT on a first time-frequency resource of an unlicensed carrier until obtaining a right to use the unlicensed carrier, the LBT comprising a LBT performed for transmitting a preamble;
after obtaining the right to use the unlicensed carrier, transmitting, by the UE, the preamble on a second time-frequency resource located after the first time-frequency resource, wherein the second time-frequency resource is a time-frequency resource of a Physical Random Access Channel PRACH at a preconfigured fixed position, or a PRACH time-frequency resource determined according to the position for performing the LBT;
wherein the first time-frequency resource comprises one of:
one orthogonal frequency division multiplexing OFDM symbol or multiple OFDM symbols before the second time-frequency resource; and
one sub-frame or multiple sub-frames before the second time-frequency resource; wherein the second time-frequency resource comprises one sub-frame or multiple sub-frames or one OFDM symbol or multiple OFDM symbols; and
wherein in the case that the first time-frequency resource is one sub-frame or multiple sub-frames before the second time-frequency resource, the first time-frequency resource comprises one of:
the last OFDM symbol or the last multiple OFDM symbols of one sub-frame before the second time-frequency resource; and
all or a part of OFDM symbols of multiple sub-frames before the second time-frequency resource.

4. A preamble transmission method according to comprising:
performing, by a user equipment UE, a Listen Before Talk LBT on a first time-frequency resource of an unlicensed carrier until obtaining a right to use the unlicensed carrier, the LBT comprising a LBT performed for transmitting a preamble;
after obtaining the right to use the unlicensed carrier, transmitting, by the UE, the preamble on a second time-frequency resource located after the first time-frequency resource, wherein the second time-frequency resource is a time-frequency resource of a Physical Random Access Channel PRACH at a preconfigured fixed position, or a PRACH time-frequency resource determined according to the position for performing the LBT;
wherein the first time-frequency resource comprises one of:
one orthogonal frequency division multiplexing OFDM symbol or multiple OFDM symbols before the second time-frequency resource; and
one sub-frame or multiple sub-frames before the second time-frequency resource; wherein the second time-frequency resource comprises one sub-frame or multiple sub-frames or one OFDM symbol or multiple OFDM symbols; and
wherein the performing, by the UE, the LBT on the first time-frequency resource of the unlicensed carrier comprises one of:
in the case that the first time-frequency resource is one OFDM symbol, performing, by the UE, a first LBT over a first time period within said one OFDM symbol;
in the case that the first time-frequency resource is multiple OFDM symbols, performing, by the UE, the first LBT over a first time period within the first OFDM symbol of the multiple OFDM symbols or within the multiple OFDM symbols;
in the case that the first time-frequency resource is one sub-frame, performing, by the UE, the first LBT over a first time period within the first OFDM symbol of said one sub-frame or within said one sub-frame; and
in the case that the first time-frequency resource is multiple sub-frames, performing, by the UE, the first LBT over a first time period within the first OFDM symbol of the multiple sub-frames or within the first sub-frame of the multiple sub-frames or within the multiple sub-frames.

5. The method according to claim 4, wherein the performing, by the UE, the LBT on the first time-frequency resource of the unlicensed carrier further comprises at least one of:
in the case that the first time-frequency resource is one OFDM symbol, performing, by the UE, a second LBT over a second time period within said one OFDM symbol;
in the case that the first time-frequency resource is one OFDM symbol, performing, by the UE, a third LBT over a third time period within said one OFDM symbol;
in the case that the first time-frequency resource is multiple OFDM symbols, performing, by the UE, the second LBT over a second time period within the second OFDM symbol of the multiple OFDM symbols or within the multiple OFDM symbols;
in the case that the first time-frequency resource is multiple OFDM symbols, performing, by the UE, the third LBT over a third time period within the third OFDM symbol of the multiple OFDM symbols or within the multiple OFDM symbols;
in the case that the first time-frequency resource is one sub-frame, performing, by the UE, the second LBT over a second time period within the second OFDM symbol of said one sub-frame or within said one sub-frame;
in the case that the first time-frequency resource is one sub-frame, performing, by the UE, the third LBT over a third time period within the third OFDM symbol of said one sub-frame or within said one sub-frame;
in the case that the first time-frequency resource is multiple sub-frames, performing, by the UE, the second LBT over a second time period within the second OFDM symbol of the multiple sub-frames or within the second sub-frame of the multiple sub-frames or within the multiple sub-frames; and
in the case that the first time-frequency resource is multiple sub-frames, performing, by the UE, the third LBT over a third time period within the third OFDM symbol of the multiple sub-frames or within the third sub-frame of the multiple sub-frames or within the multiple sub-frames.

6. The method according to claim 5, wherein LBTs performed on different time periods comprise at least one of: a LBT performed for transmitting a preamble, a LBT performed for transmitting a sounding reference signal SRS, and a LBT performed for transmitting Physical Uplink Shared Channel PUSCH, wherein the different time periods comprise at least one of a first time period, a second time period, and a third time period.

7. The method according to claim 5, wherein the first OFDM symbol is an OFDM symbol before the second OFDM symbol, and the second OFDM symbol is an OFDM symbol before the third OFDM symbol; or, the first time period is a time period before the second time period, and the second time period is a time period before the third time period; or, the first sub-frame is a sub-frame before the second sub-frame, and the second sub-frame is a sub-frame before the third sub-frame.

8. The method according to claim 1, wherein the performing, by the UE, the LBT on the first time-frequency resource of the unlicensed carrier comprises one of:
performing, by the UE, one Clear Channel Assessment CCA detection on the first time-frequency resource;
performing, by the UE, multiple CCA detections on the first time-frequency resource;
directly performing, by the UE, Evolution Clear Channel Assessment eCCA detection on the first time-frequency resource; and
after performing one CCA detection on the first time-frequency resource, performing, by the UE, eCCA detection.

9. The method according to claim 1, wherein a physical resource block PRB occupied by the second time-frequency resource in the frequency domain is transmitted on a preset frequency domain resource, wherein the preset frequency domain resource occupies no less than a predetermined ratio of frequency domain resources of the total bandwidth of the unlicensed carrier.

10. The method according to claim 9, wherein,
the PRB occupied by the second time-frequency resource in the frequency domain and the PRBs occupied by time-frequency resources for transmitting preambles of other UEs than the UE in the frequency domain occupy the entire preset frequency domain resource at a first predetermined frequency domain interval; or
the PRB occupied by the second time-frequency resource in the frequency domain is duplicated into multiple copies, and the multiple copies of the PRB occupy the entire preset frequency domain resource at a second frequency domain interval; or
the PRB occupied by the second time-frequency resource in the frequency domain is duplicated into multiple copies, and the multiple copies of the PRB occupy the entire preset frequency domain resource continuously; or
an interval of subcarriers of the PRB is modified to cause the PRB occupied by the second time-frequency resource in the frequency domain to occupy the entire preset frequency domain resource; or
the preamble is encoded according to a specific encoding rule to cause the PRB occupied by the second time-frequency resource for transmitting the preamble in the frequency domain to occupy the entire preset frequency domain resource.

11. The method according to claim 1, wherein the first time-frequency resource or the second time-frequency resource is determined by at least one of: high-layer RRC signaling, physical layer DCI signaling, a predefined manner, previously determined by the base station and the UE; and the LBT completed time.

12. The method according to claim 1, wherein the sub-carrier interval comprises one of: 1.25 kHz, 2.5 kHz, 3.75 kHz, 5 kHz, 7.5 kHz, 10 kHz, 15 kHz, 20 kHz, 30 kHz, 60 kHz and 120 kHz.

13. A preamble transmission apparatus, applied in a user equipment UE, comprising:
a performing module configured to perform a Listen Before Talk LBT on a first time-frequency resource of an unlicensed carrier until a right to use the unlicensed carrier is obtained; and
a transmitting module configured, after the right to use the unlicensed carrier is obtained, for the UE to transmit at least one of a preamble, SRS, and PUSCH on a second time-frequency resource located after the first time-frequency resource; or:
after obtaining the right to use the unlicensed carrier, transmitting by the UE the preamble in a specific manner in frequency domain according to at least one of:
the preamble being transmitted by each user equipment in frequency domain, and a specified frequency domain interval being reserved between two second time-frequency resources or preambles, the preamble being repeatedly transmitted N times in the frequency domain, and N preamble or second time-frequency resources in the frequency domain continuously, the preamble being repeatedly transmitted N times in the frequency domain and a specified frequency domain interval being provided between two second time-frequency resources or preamble, the user equipment transmitting the preamble according to a specified frequency domain pattern, the preamble being transmitted according to modifying a subcarrier interval, and a new preamble sequence being transmitted in the frequency domain, wherein the new preamble sequence is generated in a specific manner.

14. The method according to claim 1, wherein at least one of the preamble, the SRS, and the PUSCH being transmitted on a second time-frequency resource comprises one of:

if there is a certain priority for at least one of the preamble, the SRS and the PUSCH being transmitted on a second time-frequency resource, the position of one Clear Channel Assessment CCA detection corresponding to at least one of preamble, SRS and PUSCH on the first time-frequency resource can be determined according to the priority of at least one of the preamble, the SRS and the PUSCH.

15. The method according to claim 2, wherein the performing, by the UE, the LBT on the first time-frequency resource of the unlicensed carrier comprises one of:

in the case that the first time-frequency resource is one OFDM symbol, performing, by the UE, a first LBT over a first time period within said one OFDM symbol;

in the case that the first time-frequency resource is multiple OFDM symbols, performing, by the UE, the first LBT over a first time period within the first OFDM symbol of the multiple OFDM symbols or within the multiple OFDM symbols;

in the case that the first time-frequency resource is one sub-frame, performing, by the UE, the first LBT over a first time period within the first OFDM symbol of said one sub-frame or within said one sub-frame; and in the case that the first time-frequency resource is multiple sub-frames, performing, by the UE, the first LBT over a first time period within the first OFDM symbol of the multiple sub-frames or within the first sub-frame of the multiple sub-frames or within the multiple sub-frames.

16. The method according to claim 15, wherein the performing, by the UE, the LBT on the first time-frequency resource of the unlicensed carrier further comprises at least one of:

in the case that the first time-frequency resource is one OFDM symbol, performing, by the UE, a second LBT over a second time period within said one OFDM symbol;

in the case that the first time-frequency resource is one OFDM symbol, performing, by the UE, a third LBT over a third time period within said one OFDM symbol;

in the case that the first time-frequency resource is multiple OFDM symbols, performing, by the UE, the second LBT over a second time period within the second OFDM symbol of the multiple OFDM symbols or within the multiple OFDM symbols;

in the case that the first time-frequency resource is multiple OFDM symbols, performing, by the UE, the third LBT over a third time period within the third OFDM symbol of the multiple OFDM symbols or within the multiple OFDM symbols;

in the case that the first time-frequency resource is one sub-frame, performing, by the UE, the second LBT over a second time period within the second OFDM symbol of said one sub-frame or within said one sub-frame;

in the case that the first time-frequency resource is one sub-frame, performing, by the UE, the third LBT over a third time period within the third OFDM symbol of said one sub-frame or within said one sub-frame;

in the case that the first time-frequency resource is multiple sub-frames, performing, by the UE, the second LBT over a second time period within the second OFDM symbol of the multiple sub-frames or within the second sub-frame of the multiple sub-frames or within the multiple sub-frames; and in the case that the first time-frequency resource is multiple sub-frames, performing, by the UE, the third LBT over a third time period within the third OFDM symbol of the multiple sub-frames or within the third sub-frame of the multiple sub-frames or within the multiple sub-frames.

17. The method according to claim 16, wherein LBTs performed on different time periods comprise at least one of: a LBT performed for transmitting a preamble, a LBT performed for transmitting a sounding reference signal SRS, and a LBT performed for transmitting Physical Uplink Shared Channel PUSCH, wherein the different time periods comprise at least one of a first time period, a second time period, and a third time period.

18. The method according to claim 16, wherein the first OFDM symbol is an OFDM symbol before the second OFDM symbol, and the second OFDM symbol is an OFDM symbol before the third OFDM symbol; or, the first time period is a time period before the second time period, and the second time period is a time period before the third time period; or, the first sub-frame is a sub-frame before the second sub-frame, and the second sub-frame is a sub-frame before the third sub-frame.

* * * * *